United States Patent
Kanzaki et al.

(10) Patent No.: US 9,613,019 B2
(45) Date of Patent: Apr. 4, 2017

(54) TECHNIQUES FOR AUTOMATICALLY GENERATING TEST DATA

(71) Applicant: International Business Machines Corporation, Armonk, NY (US)

(72) Inventors: Eisuke Kanzaki, Kanagawa-ken (JP); Kaori Maruyama, Ibaraki-ken (JP); Tetsuo Namba, Tokyo (JP); Hideo Takeda, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 14/478,421

(22) Filed: Sep. 5, 2014

(65) Prior Publication Data

US 2015/0073778 A1    Mar. 12, 2015

(30) Foreign Application Priority Data

Sep. 6, 2013  (JP) ................................. 2013-184755

(51) Int. Cl.
  *G06F 11/263*  (2006.01)
  *G06F 17/27*  (2006.01)
(52) U.S. Cl.
  CPC ................... *G06F 17/27* (2013.01)
(58) Field of Classification Search
  None
  See application file for complete search history.

(56) References Cited

U.S. PATENT DOCUMENTS

| 6,983,309 B1 | 1/2006 | Yoshizawa | |
|---|---|---|---|
| 8,345,876 B1* | 1/2013 | Sinn | H04L 9/0656 380/255 |
| 2005/0182946 A1* | 8/2005 | Shatford | H04L 9/0643 713/185 |

(Continued)

FOREIGN PATENT DOCUMENTS

| JP | 11288216 | 10/1999 |
|---|---|---|
| JP | 2001125846 A | 5/2001 |

(Continued)

OTHER PUBLICATIONS

Wheeler (http://www.dwheeler.com/totro.html) (www.dwheeler.com/totro.pl.txt).*

(Continued)

*Primary Examiner* — Pierre-Louis Desir
*Assistant Examiner* — Jonathan Kim
(74) *Attorney, Agent, or Firm* — Cantor Colburn LLP

(57) ABSTRACT

Techniques for automatically generating test data solve various problems in test data generation. A technique of automatically generating test data includes receiving a signature to be embedded in at least one character string to be generated and determining a total sum of attribute values intrinsic to characters in the character string. The sum is associated with each element of the signature. At least one of the characters in the character string may be selected from a character table describing characters prepared to create the test data so as to achieve the determined total sum for each element of the signature. The generated test data contains the character string including the selected character.

20 Claims, 15 Drawing Sheets

(56) References Cited

U.S. PATENT DOCUMENTS

| | | | |
|---|---|---|---|
| 2007/0031009 A1* | 2/2007 | Mwale | G06F 21/32 382/115 |
| 2008/0256111 A1 | 10/2008 | Haham et al. | |
| 2009/0022319 A1* | 1/2009 | Shahaf | H04L 9/0656 380/278 |
| 2009/0217035 A1* | 8/2009 | Abdul Hameed Khan | G06F 21/31 713/168 |
| 2011/0320481 A1* | 12/2011 | Huang | G06F 17/2223 707/769 |
| 2014/0119539 A1* | 5/2014 | Zhang | H04L 9/0861 380/44 |
| 2015/0073778 A1* | 3/2015 | Kanzaki | G06F 17/27 704/9 |

FOREIGN PATENT DOCUMENTS

| | | | | | |
|---|---|---|---|---|---|
| JP | 2001125995 A | | 5/2001 | | |
| JP | 2001256076 A | | 9/2001 | | |
| JP | 2002258745 A | | 9/2002 | | |
| JP | 2009064430 A | | 3/2009 | | |
| JP | 2011085967 A | * | 4/2011 | ............ | G06F 11/28 |
| JP | 2011155162 A | | 8/2011 | | |
| JP | 2011209944 A | | 10/2011 | | |
| JP | 2012155632 A | | 8/2012 | | |

OTHER PUBLICATIONS

Ornicus (http://generator.ornicus.com/).*
Kanjinetworks (http://www.kanjinetworks.com/eng/kanji-dictionary/kanji-stroke-dictionary.cfm?stroke_id=3).*
Wheeler (http://www.dwheeler.com/totro.html) (www.dwheeler.com/totro.pl.txt.*

* cited by examiner

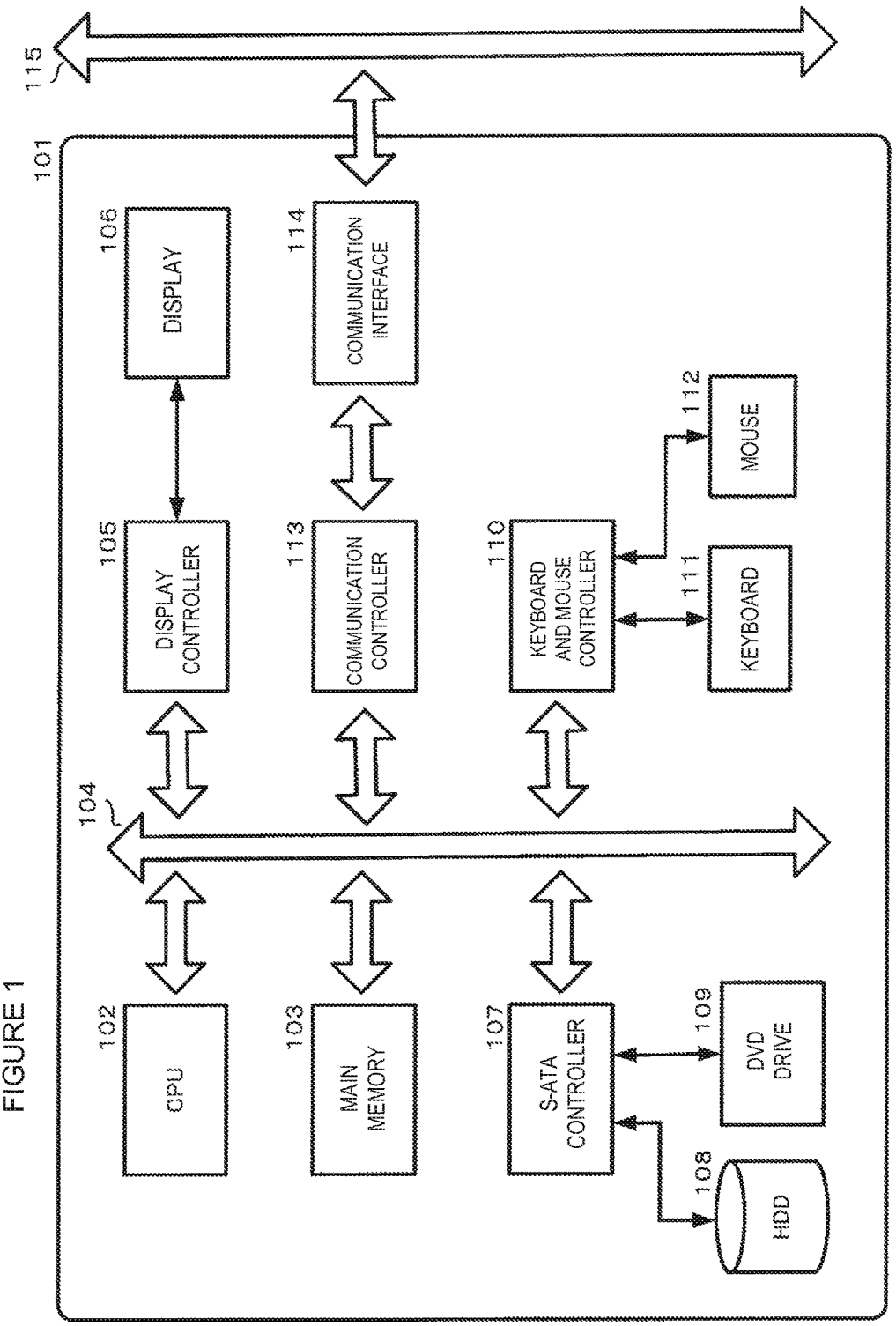

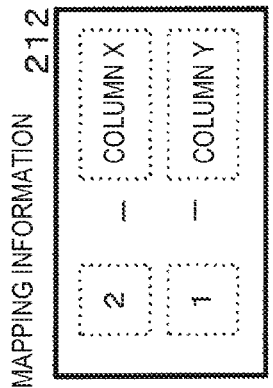
FIGURE 2B

Figure 12

| | 1 VOWEL | 2 VOWELS | 3 VOWELS | 4 VOWELS | 5 VOWELS |
|---|---|---|---|---|---|
| 1 | schu | schuam | owtawnoh | owtawnoa | owtaevsazhe |
| 2 | ept | azhe | aeunt | oulduvabdi | kuabdiwpuid |
| 3 | va | kue | zhebdiwputz | zhiuwsikte | srurcheekeeb |
| 4 | epts | ursirs | drikterche | lfannewnecaml | lawkosprabwoe |
| 5 | zhe | uwsi | keelsurm | lawkosprabwon | ubmeoitiu |
| 6 | bhirs | chee | ckoispra | vrohmedlubpurl | schiodhiabniwribs |
| 7 | icl | flannem | feeonn | stevaubnirx | etnugsowhain |
| 8 | ti | zrecami | spoubpu | iscetnugso | skeptiakpeizo |
| 9 | esp | awko | ociv | ackineosk | auiltoka |
| 10 | em | scebwon | ueirx | staakpeob | roubwurzue |
| 11 | bre | speonn | cresent | juduokapt | zhirchiumpewtesp |
| 12 | bu | aopts | chuoerr | schubwurzue | amrorlirzina |
| 13 | ia | umsogi | laii | zhirchiblumpe | iidaghebdabke |
| 14 | sti | abnirx | veouphs | diuawteutls | glunakharcheobs |
| 15 | io | crescent | aeepf | iuurzin | tuswovawzao |
| 16 | oleltz | chugsofl | ajulpts | eildae | ifsursabhalzo |
| 17 | agz | ain | blokaopts | bhaesteun | spadnadnoswia |
| 18 | ilk | veptims | bhurzuezz | aercheo | kheimzaghau |
| 19 | ogl | ghakpe | yasiblu | tuswovawzam | frulnaskockaupf |
| 20 | vann | faapf | eawtesp | uabhalzo | veknubmebduot |
| 21 | ski | thilto | piamrodi | spadnadnoswirg | zonnofsucmucko |
| 22 | clabm | paopts | diinamri | bocneimza | apreadkii |
| 23 | fu | ubwu | phasibd | uichui | euknuzroed |
| 24 | vro | kugsam | snele | ockanchimnemr | ekweadtidmein |
| 25 | ladn | iurm | unakhasc | zassibduo | aoesrufli |
| 26 | chent | vrawtesp | abnewsugz | stonnoucmu | utzaeghueim |
| 27 | ims | plai | saoa | abmoensa | vristucsoltuskroch |
| 28 | ghabn | etwu | mifsuabl | niazruaml | koustosriegz |
| 29 | spo | phii | soessa | xocteikwe | efreodlemra |
| 30 | apf | ghemri | chadnoswirg | adtidmearts | flarmutzudfokhubn |
| 31 | thipts | phaghegs | ooed | zesruflittfru | iuppenruurn |
| 32 | pa | tsae | odtagli | blutzaaghu | oschusrasvicnorm |
| 33 | obd | enchiss | fliwhocka | sefsuestu | uabrabsios |
| 34 | klultz | zrarcherr | imneknu | oltuskroi | ecruzekmodra |
| 35 | urn | ewsu | assiuhs | kostosrie | arsirmubpai |
| 36 | ibn | schao | tobcoivs | craefrebro | dlepaunsottfrawz |
| 37 | ek | ckownint | kouo | iainchabm | llitsezofrie |
| 38 | cki | huabl | uckoo | uokwudfo | slawpotabwaakr |
| 39 | udi | oekl | zeadki | snublispluetz | uawtenuept |
| 40 | esp | prautz | azrua | pleaskuu | evseinnugsa |
| 41 | ebr | fuirg | thectekwe | peusraotz | chiszeidtoubs |
| 42 | sted | bocne | snaiu | empiuack | wuscroiktoi |
| 43 | uts | umzain | tsaabcezz | utwowkespruft | duarchuinuics |
| 44 | natls | uict | stittfrutu | ikmodrasrisz | appauchomu |
| 45 | brint | flia | anraut | pibpaitra | blolzeudfuksi |
| 46 | egs | khaars | vefsustuff | epawsuo | lirxispteiir |
| 47 | abm | sreawl | dhuua | ockoeib | ahemlebrookh |
| 48 | se | assi | crutloufl | uiofrisp | ofoghemsuzu |
| 49 | glun | shmoo | snilmueck | kawpoita | nadrozudfughick |
| 50 | asc | onno | citrairs | awtenuvseh | uzrowruflakloss |
| 51 | pha | skuodn | bluon | bruegrien | oppeuswibti |
| 52 | ze | klao | phokhubti | abculzagack | wresprounabromnarts |
| 53 | tu | apre | dleppee | oriurcha | kreomnoskia |
| 54 | oj | ghizrumr | ckuumrip | kliinuzoasr | weonrarliut |
| 55 | two | theo | klaasvirs | uochoo | itlaabkiuni |
| 56 | om | ucte | kheeduwn | ckolzeguo | tsirloospruliujs |
| 57 | kutn | edlims | oaud | iimlirxi | eaegzivri |
| 58 | apf | plaa | espruugh | wrehiwhahe | schlaitlulduetts |
| 59 | spa | esru | ekmoa | glolzoekso | euctocei |
| 60 | schlacl | ittfru | phairmurg | emsuairg | ustookroinasi |
| 61 | schlong | tutzarz | wribpaiw | ufridrozu | asnaosmazha |
| 62 | slacr | uelm | krepawsu | ughisckuzro | eaedroklu |
| 63 | dre | vrii | pooawz | uflaxforcho | eaogseecka |
| 64 | bhokr | drucso | spitseuy | bruuskii | eochowkou |
| 65 | ghuis | ruskro | diurxiekt | grospronnabroz | drikhoagzibwe |

Figure 13

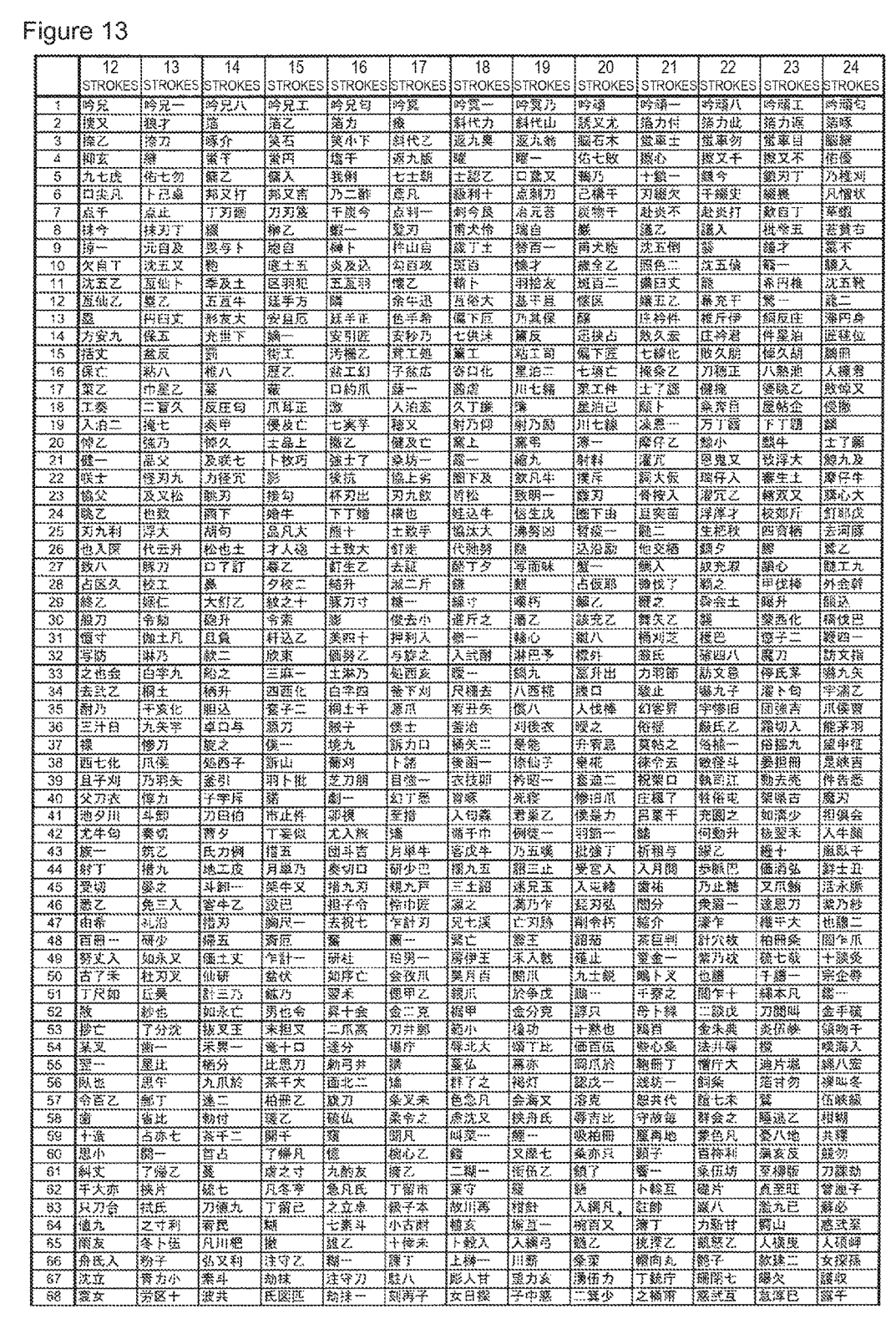

| | 12 STROKES | 13 STROKES | 14 STROKES | 15 STROKES | 16 STROKES | 17 STROKES | 18 STROKES | 19 STROKES | 20 STROKES | 21 STROKES | 22 STROKES | 23 STROKES | 24 STROKES |
|---|---|---|---|---|---|---|---|---|---|---|---|---|---|
| 1 | 吟兒 | 吟兒一 | 吟兒八 | 吟兒工 | 吟兒匂 | 吟冥 | 吟冥一 | 吟冥乃 | 吟頑 | 吟頑一 | 吟頑八 | 吟頑工 | 吟頑匂 |
| 2 | 捜又 | 狼才 | 箔 | 箔乙 | 箔力 | 癈 | 斜代力 | 斜代山 | 誘又尤 | 箔力付 | 箔力此 | 箔力近 | 箔啄 |
| 3 | 捺乙 | 捺刀 | 啄介 | 笑石 | 笑小下 | 斜代乙 | 返九奥 | 返九翁 | 脳石木 | 蛍車士 | 蛍車勿 | 蛍車目 | 脳継 |
| 4 | 抑玄 | 継 | 蛍干 | 蛍円 | 塩干 | 返九版 | 曜 | 曜一 | 佑七敗 | 撚心 | 撚又干 | 撚又不 | 佑優 |
| 5 | 九七虎 | 佑七勿 | 犠乙 | 犠入 | 我俐 | 七士朝 | 士認乙 | 口薦又 | 鵜乃 | 十鍛一 | 継今 | 鍛刃丁 | 乃楼刈 |
| 6 | 口尖凡 | 卜召彔 | 邦又打 | 邦又斉 | 乃二酔 | 鳶凡 | 級利十 | 点剃刀 | 己穢干 | 刃繊欠 | 千繊史 | 繊暴 | 凡榴状 |
| 7 | 点千 | 点止 | 丁刃麺 | 刀刃笈 | 干炭今 | 点判一 | 刺今良 | 冶元苔 | 炭物干 | 赴炎不 | 赴炎打 | 敵自丁 | 華蝦 |
| 8 | 抹今 | 抹刃丁 | 綴 | 柳乙 | 鰍一 | 髪刃 | 南大伶 | 瑞白 | 藪 | 護乙 | 護入 | 桃参五 | 芸貨古 |
| 9 | 埣一 | 元自及 | 毀母卜 | 総自 | 紳卜 | 梓山自 | 綴丁士 | 替百一 | 両犬胎 | 沈五俐 | 藝 | 鐘才 | 蒙不 |
| 10 | 欠自丁 | 沈五又 | 鞄 | 逐土五 | 炎及込 | 匈百攻 | 斑齒 | 橡才 | 燕全乙 | 照色二 | 沈五侯 | 籍一 | 驍入 |
| 11 | 沈五乙 | 亙仙卜 | 季及土 | 区羽犯 | 五亙羽 | 懐乙 | 鞘卜 | 羽拾友 | 斑百二 | 擒臼文 | 鯨 | 系円椎 | 沈五靴 |
| 12 | 亙仙乙 | 塁乙 | 五亙牛 | 廷手方 | 隣 | 余牛迅 | 亙俗大 | 甚干旦 | 懐医 | 鎌五乙 | 幕充干 | 鶩一 | 蕗二 |
| 13 | 墨 | 円臼丈 | 彩友大 | 安旦厄 | 廷手正 | 色手斧 | 儒下厄 | 乃其保 | 藤 | 庄衿件 | 稚斤伊 | 銅反庄 | 滞円身 |
| 14 | 方安九 | 保五 | 充世下 | 嫡一 | 安引匿 | 安秒乃 | 七供沫 | 簾反 | 逆挟占 | 敗久菰 | 庄衿君 | 件墨治 | 匿毬位 |
| 15 | 括文 | 盆反 | 罰 | 衛工 | 汚襁乙 | 賛工処 | 薫工 | 粘工司 | 編下匿 | 七線化 | 敗久胎 | 棹久胡 | 鵬冊 |
| 16 | 保亡 | 粘八 | 稚八 | 歴乙 | 総工幻 | 子総岳 | 寄臼化 | 墨泊二 | 七瑛亡 | 掩条乙 | 刀穏正 | 八熱池 | 人擦砦 |
| 17 | 菜乙 | 巾墨乙 | 蔡 | 蔽 | 口約爪 | 蕗一 | 酋虜 | 川七緒 | 菜工件 | 士了謡 | 礎掩 | 嬰暁乙 | 敗埣又 |
| 18 | 工参 | 二盲久 | 反庄匂 | 爪耳正 | 激 | 入治宏 | 久丁簾 | 簿 | 墨泊己 | 鵬卜 | 条斉白 | 屋帖企 | 優撒 |
| 19 | 入治二 | 掩七 | 奏甲 | 侵友亡 | 七寅芋 | 穂又 | 射乃仰 | 射乃励 | 川七線 | 凍思一 | 万丁霞 | 下丁題 | 鐵 |
| 20 | 悼乙 | 強乃 | 悼久 | 士品上 | 徽乙 | 健及亡 | 窯上 | 窯弔 | 薄一 | 摩仔乙 | 鯨小 | 鵜牛 | 士了顧 |
| 21 | 鍵一 | 品文 | 及咲七 | 卜枚巧 | 強士了 | 染坊一 | 霞一 | 縮九 | 射料 | 灌冗 | 恩鬼又 | 鼓浮大 | 鯨九及 |
| 22 | 咲士 | 怪刃九 | 力径冗 | 影 | 後抗 | 協上劣 | 閣下及 | 欽凡牛 | 撲斥 | 鋼大仮 | 瑠仔入 | 審生土 | 摩仔牛 |
| 23 | 協父 | 及又松 | 鯵刃 | 綾匂 | 杯刃出 | 刃九飲 | 酢松 | 致明一 | 鍍刃 | 骨椅入 | 溜冗乙 | 鞭双又 | 鯵心大 |
| 24 | 暁乙 | 也致 | 爾下 | 蟾牛 | 下丁婚 | 横也 | 蛙込牛 | 悩生戊 | 圏下由 | 且突茵 | 浮岸才 | 校郊斤 | 釘郎戊 |
| 25 | 刈九利 | 浮大 | 胡句 | 品凡大 | 熊十 | 士致手 | 協汰大 | 沸努凶 | 哲痰一 | 髄二 | 生耙秋 | 四宵楢 | 去洞豚 |
| 26 | 也入匣 | 代云升 | 松也土 | 才人砲 | 土致大 | 釘逆 | 代融努 | 麟 | 込沿励 | 他交栖 | 顕夕 | 鰐 | 蕎乙 |
| 27 | 致八 | 豚刀 | 口了訂 | 蓉乙 | 釘生乙 | 去証 | 懿丁夕 | 写面昧 | 鮫一 | 鯨入 | 奴充淑 | 韻心 | 髄工九 |
| 28 | 占区久 | 校工 | 彔 | 夕校二 | 結升 | 淑二斤 | 鎌 | 麒 | 占仮那 | 豫枝了 | 鶏之 | 甲伐棒 | 外金幹 |
| 29 | 終乙 | 娠仁 | 大釘乙 | 紋之十 | 豚刀寸 | 糖一 | 線寸 | 噴朽 | 鰯乙 | 纏之 | 蹄余土 | 縣升 | 韻込 |
| 30 | 般刀 | 令勅 | 砲升 | 令索 | 膨 | 俊去小 | 逆斤之 | 潘乙 | 該充乙 | 舞矢乙 | 襲 | 黎西化 | 稿伐巴 |
| 31 | 個寸 | 伽土凡 | 且負 | 杆込乙 | 美四十 | 押利入 | 鐵一 | 鯨心 | 鯛八 | 楠刈芝 | 樓巴 | 懐子二 | 綴四一 |
| 32 | 写防 | 淋乃 | 款二 | 欣東 | 個努乙 | 与旋之 | 入試酬 | 淋巴予 | 標外 | 薮氏 | 箔四八 | 魔刀 | 訪文指 |
| 33 | 之也会 | 白字九 | 船之 | 三麻一 | 士淋乃 | 処西亥 | 暖一 | 鋼九 | 羅升出 | 力羽節 | 訪文息 | 停氏茅 | 獺九矢 |
| 34 | 去試乙 | 桐土 | 柄升 | 四西化 | 白字四 | 谷下刈 | 尺欄去 | 八西椛 | 騰口 | 鍛止 | 蝋九子 | 濯卜匂 | 宇淵乙 |
| 35 | 酎乃 | 干亥化 | 胆込 | 蓑子二 | 桐土干 | 源爪 | 寄丑矢 | 僕八 | 人悦棒 | 幻客界 | 宇惨旧 | 団強斉 | 爪優習 |
| 36 | 三汁臼 | 九矢字 | 卓口与 | 源乃 | 猴子 | 僕士 | 釜治 | 刈後衣 | 曖之 | 俗擬 | 厳氏乙 | 羅切入 | 能茅羽 |
| 37 | 操 | 惨刀 | 旋之 | 僕一 | 境九 | 訴力口 | 稀矢二 | 憂能 | 升宵懸 | 冥帖之 | 俗穂一 | 船揺九 | 紐申征 |
| 38 | 西七化 | 爪僕 | 処西子 | 訴山 | 衛刈 | 卜諸 | 後函一 | 捺仙子 | 寮花 | 徐令云 | 歓径斗 | 婁担冊 | 是峡吉 |
| 39 | 且子刈 | 乃羽矢 | 釜引 | 羽卜批 | 芝刀朋 | 目強一 | 衣技卯 | 衿昭一 | 釜迫二 | 祝架口 | 執司江 | 勤去尭 | 件告悉 |
| 40 | 父刀衣 | 惇力 | 子字斥 | 豬 | 劇一 | 幻丁悉 | 習啄 | 飛駿 | 惨旧爪 | 庄糎了 | 牲俗屯 | 架隈古 | 魔刃 |
| 41 | 池夕川 | 斗卸 | 刀臼伯 | 市止件 | 邪襖 | 至指 | 入旬森 | 君巣乙 | 侯是力 | 呂業干 | 充圏之 | 如濱少 | 担倶会 |
| 42 | 尤牛匂 | 奏切 | 胥夕 | 丁妾似 | 尤入旅 | 鴻 | 循予巾 | 例従一 | 羽節一 | 鐘 | 何勤升 | 抜翌未 | 入牛鵜 |
| 43 | 旋一 | 筑乙 | 氏力柄 | 措五 | 団斗吉 | 月単牛 | 客戊牛 | 乃五蝶 | 批強丁 | 祈租与 | 繰乙 | 纏十 | 嵐臥干 |
| 44 | 射丁 | 措九 | 地工皮 | 月単乃 | 奏切口 | 研少巴 | 播九五 | 韶三止 | 愛宮入 | 入月閲 | 歩脈巴 | 簾酒弘 | 鮮士丑 |
| 45 | 愛切 | 婆之 | 斗卸一 | 架牛又 | 措九刈 | 規九戸 | 三土韶 | 迷兄玉 | 入宅緒 | 鐵祐 | 乃止糖 | 又爪鯨 | 活永脈 |
| 46 | 悪乙 | 免三入 | 客牛乙 | 設巴 | 担子令 | 栓巾匠 | 溺之 | 満乃乍 | 疑刃弘 | 閻分 | 衆溜一 | 遂恩刀 | 梁乃紗 |
| 47 | 由希 | 礼沿 | 措刃 | 鋤尺一 | 去祝七 | 乍計刃 | 兄七渓 | 亡刃跡 | 削令朽 | 縮介 | 濠乍 | 纏干大 | 也鵜二 |
| 48 | 百冊一 | 研少 | 帰五 | 斎厄 | 叢 | 叢一 | 緊亡 | 叢王 | 詔裕 | 斎巨判 | 計穴枚 | 柏冊条 | 閻乍爪 |
| 49 | 努丈入 | 如永又 | 価土丈 | 乍計一 | 研社 | 珀男一 | 房伊王 | 禾入戟 | 雄止 | 鑑金一 | 紫乃枚 | 襟七戟 | 十謎炎 |
| 50 | 古了未 | 杜刃叉 | 仙研 | 盆伏 | 如序亡 | 金夜爪 | 異月百 | 閣爪 | 九士鋭 | 鴨卜叉 | 也語 | 千譜一 | 宗企骨 |
| 51 | 丁尺如 | 丘昊 | 計三乃 | 鉢乃 | 翌禾 | 徳甲乙 | 親爪 | 於争戊 | 鵬一 | 千寮之 | 閻乍十 | 綿本凡 | 鑑一 |
| 52 | 散 | 紗也 | 如永亡 | 男也令 | 異十会 | 金二克 | 槁甲 | 金分克 | 諄只 | 骨卜緑 | 二謎戊 | 刀閲叫 | 金手獄 |
| 53 | 抄亡 | 了分沈 | 抜叉王 | 未担又 | 二爪高 | 刀井郵 | 範小 | 橡功 | 十熱也 | 蹟酉 | 金朱奥 | 炎伍鯵 | 領吻干 |
| 54 | 某叉 | 衝一 | 禾累一 | 竜十口 | 途分 | 場庁 | 尋北大 | 鎖丁比 | 価百伍 | 整心条 | 法井尋 | 鍛 | 喉海入 |
| 55 | 翌一 | 墨比 | 稲分 | 比恩刀 | 勅弓并 | 譜 | 蔓仏 | 幕亦 | 開爪於 | 鞠冊丁 | 憎斤大 | 油片堀 | 縄八蜜 |
| 56 | 陝也 | 思乍 | 九爪於 | 茶干大 | 道北二 | 譜 | 群了之 | 銘灯 | 認戊一 | 践坊一 | 飼粂 | 箔甘勿 | 裸叫冬 |
| 57 | 令百乙 | 鄙丁 | 遂二 | 柏冊乙 | 旗刀 | 粂叉来 | 色急凡 | 会海又 | 溶克 | 怨共代 | 諠七未 | 鴛 | 伍峡綴 |
| 58 | 爾 | 省比 | 勅付 | 謹乙 | 碩仏 | 粂令之 | 虜沈又 | 挟舟氏 | 尋吉比 | 守敵毎 | 群会之 | 睡迷乙 | 湘糊 |
| 59 | 十淮 | 占亦七 | 斧干二 | 闘千 | 寵 | 閲凡 | 叫菜一 | 鰯一 | 吸柏冊 | 鷹再地 | 爹色凡 | 登八地 | 共穣 |
| 60 | 思小 | 鯛一 | 首占 | 了帰凡 | 儂 | 椀心乙 | 鏡 | 又慶七 | 桑亦只 | 顕子 | 苗祢利 | 満亥反 | 鏡勿 |
| 61 | 糾丈 | 了帰乙 | 叢 | 慮之寸 | 九齢友 | 擦乙 | 二糊一 | 衛伍乙 | 鎖了 | 馨一 | 粂伍坊 | 至柳飯 | 刀諌劾 |
| 62 | 千大亦 | 挟片 | 琉七 | 凡冬亨 | 急凡氏 | 丁留市 | 棄守 | 縫 | 鰯 | 卜緑互 | 礎片 | 貞至旺 | 箸遡子 |
| 63 | 只刀合 | 拭氏 | 刀徳九 | 丁留己 | 之立卓 | 縦子本 | 故川再 | 称針 | 入縄凡、 | 註帥 | 厳八 | 濫九巳 | 蘇必 |
| 64 | 値九 | 之寸利 | 哥民 | 糊 | 七素斗 | 小古酎 | 植亥 | 旅旦一 | 椀百又 | 簿丁 | 力飯甘 | 鷲山 | 惑弐至 |
| 65 | 雨友 | 冬卜岱 | 凡川杷 | 撤 | 謎乙 | 十倖未 | 卜穀入 | 入縄弓 | 髄乙 | 拔澪乙 | 鵬怒乙 | 人様曳 | 人頑岬 |
| 66 | 舟氏入 | 粉子 | 弘又利 | 注守乙 | 糊一 | 謀丁 | 上梯一 | 川爵 | 条菜 | 帽向丸 | 鯨子 | 款棘二 | 女探孫 |
| 67 | 沈立 | 脊力小 | 素斗 | 刻抹 | 注守刀 | 駐八 | 彫人甘 | 恩力亥 | 湧伍力 | 丁銃庁 | 珊階七 | 嬰欠 | 護収 |
| 68 | 衰女 | 労区十 | 波共 | 氏図匹 | 刻抹一 | 刻再子 | 女日探 | 子中惑 | 二冀少 | 之楠雨 | 惑弐亘 | 慈淳巳 | 露干 |

TECHNIQUES FOR AUTOMATICALLY GENERATING TEST DATA

FOREIGN PRIORITY

This application claims priority to Japanese Patent Application No. 2013-184775 filed Sep. 6, 2013, and all the benefits accruing therefrom under 35 U.S.C. §119, the contents of which in its entirety are herein incorporated by reference.

BACKGROUND

This disclosure relates to computer testing systems utilizing test data and, more particularly, to techniques for automatically generating test data.

Test data (also referred to as character string data for test) is used instead of live data in a variety of test operations, such as testing whether a system is operating normally or whether the system can be resistant to a load. While live customer data could be used as test data, created test data is preferred to prevent leakage of customer data. Test data can also be linked to computer units, modules or subsystems in system development. For example, test data may be used for an entire system test, or for a stress test on whether a specific web application is resistant to a particular actual operation, and so forth.

Various conventional methods have been known. In the conventional art, a specific character string may be added to live data to create test data. For instance, the data may be in the form "test_XXXXX" (which may be an alphabetic or pictorial character data) where a specific character string "test_" is added to live data "XXXXX". Alternatively, the same character string may be used at all positions to acquire test data. In this case, the data may be in the form "XXXXX" where all of the data is created for test purposes. Irregular character strings may also be randomly generated to create the test data. The data may be, for instance, "fkwLkxP". As another option, pictorial characters or character strings selected from a lookup table may also serve as test data. For instance, the data may include pictorial characters, such as 斉藤, 鈴木, and 佐藤.

SUMMARY

Embodiments include a method, system, and computer program product for automatically generating test data. A method includes receiving a signature to be embedded in at least one character string to be generated. A total sum of attribute values intrinsic to characters in the character string is determined, where the sum is associated with each element of the signature. A least one of characters configuring the character string is selected from a character table describing characters prepared to create the test data so as to achieve the determined total sum for each element of the signature. The generated test data includes the character string including the selected character.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 is a diagram showing an example of a computer that can be used in an embodiment.

FIG. 2B is a diagram for illustrating the technique of generating test data with a value representing, as an attribute value, a vowel in the language that uses vowels and consonants in the discriminated manner in accordance with an embodiment.

FIG. 12 shows an example of a character string (combination of vowel characters and consonant characters in a character string) selected so as to achieve the total sum of values representing a vowel in a character string according to an embodiment.

FIG. 13 shows an example of a character string selected so as to achieve the total sum of values representing the number of strokes of each character in a character string in accordance with an embodiment.

DETAILED DESCRIPTION

Figure 2A:
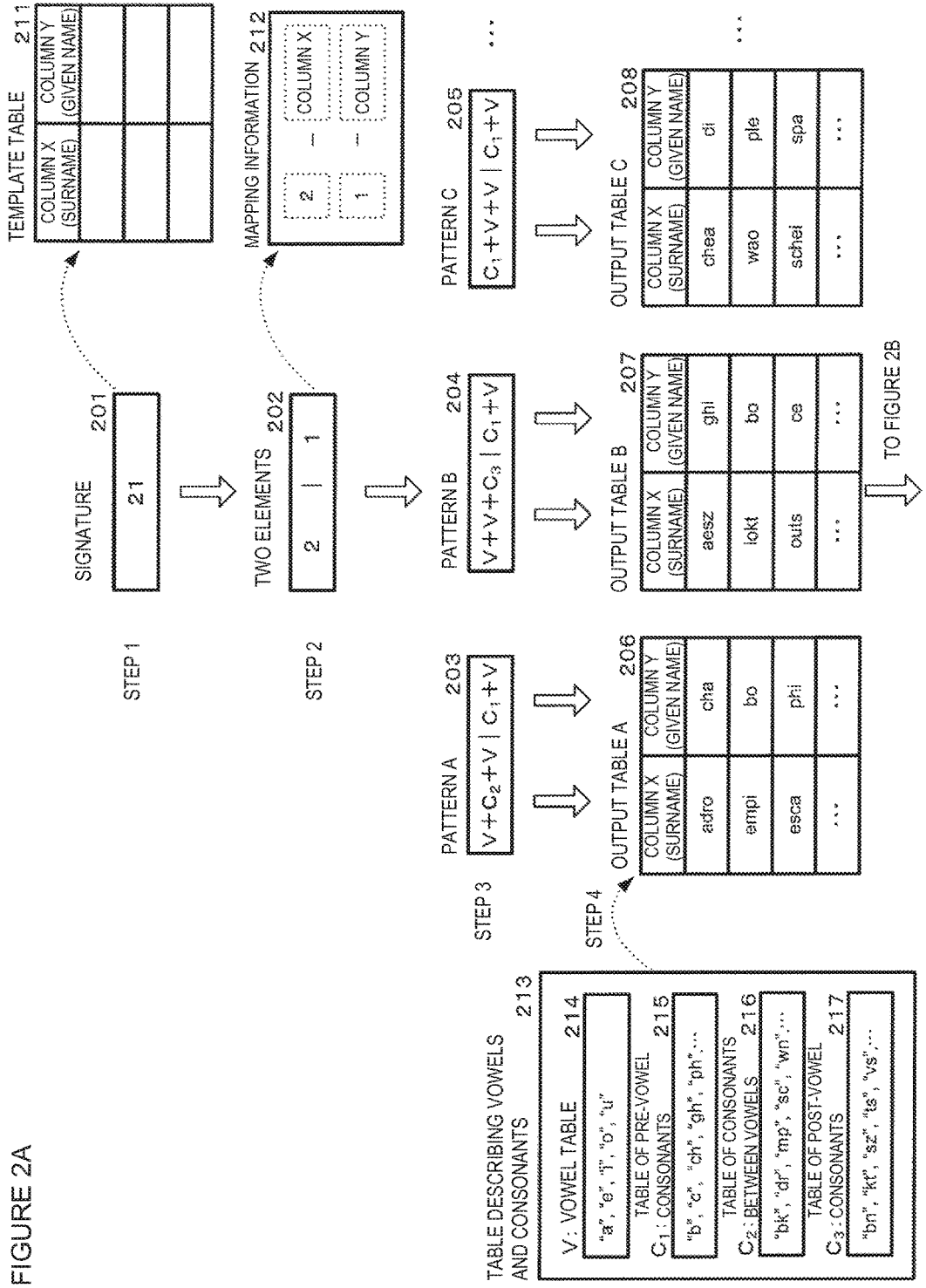
FIG. 2A is a diagram for illustrating a technique of generating test data with a value representing, as an attribute value, a vowel in a language that uses vowels and consonants in a discriminated manner in accordance with an embodiment.

Embodiments may be realized in a system, method and computer product for automatically generating test data to solve various problems in test data generation. A technique of automatically generating test data includes receiving a signature to be embedded in at least one character string to be generated and determining a total sum of attribute values intrinsic to characters in the character string. The sum is associated with each element of the signature. At least one of the characters in the character string may be selected from a character table describing characters prepared to create the test data so as to achieve the determined total sum for each element of the signature. The generated test data contains the character string including the selected character.

In the embodiments of the present invention, "test data" is character string data for test and, for instance, may be data used instead of live data for testing whether, for instance, the system normally operates or not or whether the system can be resistant to a load or not. The "test data" may also be test data including the character string data as mask data that is to be used for preventing security information from leaking.

A "signature" is characteristic information to be added to the test data when the test data is generated. The signature includes numbers and may include one or multiple elements. The signature is, for instance, information on a test data generating tool (e.g., a product number, a version number, or a license number), a number intrinsic to a user who generates or uses test data (e.g., user ID), or, for instance, the date and time when the test data is generated. In the case when a signature is, for instance, a signature including the date and time, the signature may be, for instance, "20131231". In the case where the signature including the date and time is composed of, for instance, numbers having each element composed of a one-digit number, the elements are composed of "2", "0", "1", "3", "1", "2", "3" and "1". Alternatively, in the case where the elements are composed of numbers having each element composed of a two-digit number, the elements are composed of "20", "13", "12" and "31".

Users using test data sometimes wish to be able to verify that the test data has been certainly generated as test data. Some pieces of test data are incapable of being verified as data having been generated as test data. Accordingly, if live data were mixed in the data, no one would find the fact. According to the method of adding a prescribed character string to live data to acquire test data, the data sometimes has characteristics different from those of live data. For instance, in the case where the field type of live data is Kanji, acquisition of test data through adding a prescribed character string "TEST_" (half-width or single-byte characters) to the live data (Kanji) unfortunately allows a half-width character to be mixed into the field. Thus, mixture of a half-width character into the field breaks the type.

Meta information may also be included in generated test data itself. For instance, a characteristic signature may be included in test data to allow the signature to be taken from the test data itself. It is also demanded that in case where a test data generating tool or test data generated through the test data generating tool is used without authorization, the unauthorized use can be easily identified. Even if the character codes (codepage) are changed, the signature associated with test data is not lost. For instance, even with difference in character code, half-width or full-width or typeface or font, the signature can still be recognized. In addition, the signature is recognized with any manner of displaying of a character string of test data. For instance, the signature is sometimes desired to be verified by the naked eye also from printed test data or test data displayed on a display screen.

The generated test data itself has recognizable, intrinsic characteristics. If the test data includes multiple items (e.g., items in database software, cells in spreadsheet software, items in templates in various types of application software), the same signature may be included in every item. For instance, the same signature may be included in every item, thereby allowing the signature to be extracted only through extraction of a part of data. If variation of generated test data is small or biased, the variation may be increased or eliminated.

An embodiment provides a technique of automatically generating test data including character strings. This technique may involve a method of automatically generating the test data, and a computer, computer program and computer program product thereof. A signature may be embedded in the test data including character strings. This technique may involve identifying the signature embedded in the test data.

A method of automatically generating test data including a character string, includes receiving a signature to be embedded in at least one character string to be generated; determining a total sum of attribute values intrinsic to characters in the character string, the sum being associated with each element of the signature; and selecting at least one of characters configuring the character string from a character table describing characters prepared to create the test data so as to achieve the determined total sum for each element of the signature, and generating test data including the character string including the selected character.

The method of identifying a signature embedded in test data including a character string includes receiving test data including multiple items; acquiring a total sum of attribute values by analyzing the attribute values intrinsic to respective characters of the character string in the test data on the basis of mapping information, the mapping information including mapping information on the items and the total sum of the attribute values associated with the respective items; and identifying the signature of the test data on the basis of the total sum.

A computer that automatically generates test data includes a signature reception module for receiving a signature to be embedded in at least one character string to be generated. A total sum determination module determines a total sum of attribute values intrinsic to respective characters in the character string associated with each element of the signature. A character selection module selects at least one of characters configuring the character string from a character table describing characters prepared to create the test data so as to achieve the determined total sum, for each element of the signature. The system generates the test data containing a character string including the selected character.

In an embodiment, the character selection module may determine at least one combination pattern of the attribute values intrinsic to the respective characters in the character string so as to achieve the determined total sum. The character selection module may select at least one of characters configuring the character string from the character table, for each combination pattern of the attribute values intrinsic to the respective characters. The computer may include signature division module for dividing the signature into multiple elements. These divided elements configure the respective elements of the signature. The division module may divide the signature into one-digit numbers. The divided one-digit numbers may configure each element of the signature.

In the case where the test data includes multiple items, the computer may further include mapping information generation module for associating the elements with the respective items. Alternatively, the mapping information generation module may associate the elements with respective words in the item. The word may be a word having a meaning or a word having no meaning. The character selection module may insert, as a delimiter, at least one character of a type different from a type of characters configuring a first character string associated with a first element and a second character string associated with a second element between the first and second character strings, in a case where the signature includes these elements. The character selection module may determine at least one combination pattern of the attribute values intrinsic to the respective characters in the character string by generating a random number or calculating a hash value so as to achieve the determined total sum. The character selection module may also select the at least one character from the character table by generating a random number or calculating a hash value, for each character string to be generated.

In the case where the attribute value is a value representing a vowel in a language that uses vowels and consonants in a discriminated manner and the character table is a table describing the vowels and the consonants, the total sum determination module may determine the total sum of values representing vowels in the character string associated with each element of the signature. The character selection module may also determine at least one combination pattern of the vowel character and the consonant character in the character string so as to achieve the determined total sum, for each element of the signature. The character selection module may select characters configuring the character string from the character table for each of the combination patterns of vowel characters and consonant characters.

In the case where the attribute value is the number of strokes of the character in the language that includes characters having a prescribed number of strokes and the character table is a table describing the number of strokes and the character associated with the number of strokes. The total sum determination module may determine the total sum of the number of strokes of each character in a character string associated with each element of the signature. The character selection module may determine at least one combination pattern of the numbers of strokes of the respective characters in the character string so as to achieve the determined total sum, for each element of the signature. The character selection module may select at least one of characters configuring the character string for each combination pattern of the numbers of strokes of the characters.

The computer identifying a signature embedded in test data including a character string may include a test data reception module for receiving test data including multiple items. An analysis module acquires a total sum of attribute values by analyzing the attribute values intrinsic to respective characters of the character string in the test data on the basis of mapping information, the mapping information including mapping information on the items and the total sum of the attribute values associated with the respective items. A signature identification module identifies the signature of the test data on the basis of the total sum.

Technical effects and benefits include allowing a user to verify that test data generated has certainly been generated as test data. The test data may include a signature. Even if the character code is changed in test data generated, the signature in the test date is not lost. The signature can be recognized in test data generated when the character string of the test data is displayed in any suitable manner (e.g., printed test data, and test data displayed on a display screen). In the case where test data includes multiple items of data, the same signature can be included in every item. In the test data, the length of the character string (the number of characters) can be arbitrarily changed. Accordingly, the number of variations can be increased. Test data itself has recognizable, intrinsic characteristics (the number of strokes of Kanji, or the number of vowels of alphabet).

Turning now to the figures, embodiments are described with reference to the drawings. FIG. 1 is a diagram showing an example of a computer usable for an embodiment. The computer (101) includes a CPU (102) and a main memory (103), which are connected to a bus (104). Preferably, the CPU (102) is based on a 32-bit or 64-bit architecture. The CPU (102) is, for instance, Core™ i series, Core™ 2 series, Atom™ series, Xeon® series, Pentium® series or Celeron® series by Intel Corporation, A series, Phenom™ series, Athlon™ series, Turion™ series or Sempron™ by AMD (Advanced Micro Devices), or Power™ series by International Business Machines Corporation.

A display (106), e.g., a liquid crystal display (LCD), can be connected to the bus (104) via a display controller (105). The liquid crystal display (LCD) may be, for instance, a touch panel display or a floating touch display. The display (106) may be used for displaying an object that is to be displayed by operation of software (e.g., a computer program, or various computer programs operating on the computer (101)) operating on the computer (101) through an appropriate graphic interface.

A disk (108), e.g., a hard disk or a solid state drive (SSD), can be optionally connected to the bus (104) via e.g., an SATA or IDE controller (107). A drive (109), e.g., a CD, DVD or BD drive, can be optionally connected to the bus (104) via e.g., the SATA or IDE controller (107). A keyboard (111) and a mouse (112) can be optionally connected to the bus (104) via a peripheral device controller (110), e.g., a keyboard and mouse controller or a USB bus. The disk (108) may store a program that provides an operating system, e.g., Windows® OS, UNIX®, MacOS®, and Java® processing environment, such as J2EE, Java® application, Java® virtual machine (VM), and Java® just-in-time (JIT) compiler, a computer program, and another program, and data, in a manner that can be loaded into the main memory (103). The disk (108) may be embedded in the computer (101), connected via a cable in a manner of allowing the computer (101) to be accessible, or connected via a wired or wireless network in a manner allowing the computer (101) to be accessible.

The drive (109) may be used for installing a program, for instance, an operating system, an application or a computer program, into the disk (108) from a CD-ROM, DVD-ROM or BD, as necessary. A communication interface (114) is in conformity with, e.g., the Ethernet® protocol. The communication interface (114) is connected to the bus (104) via the communication controller (113), performs a role of connecting the computer (101) to a communication line (115) in a wired or wireless manner, and provides a network interface layer for the TCP/IP communication protocol of a communication function of the operating system of the computer (101). The communication line is, for instance, a wireless LAN environment in conformity with wireless LAN connection standards, a Wi-Fi wireless LAN environment, such as IEEE802.11a/b/g/n, or a mobile phone network environment (e.g., 3G or 4G environment).

On each language that uses vowels and consonants in a discriminated manner, and a language that includes characters having a prescribed number of strokes, a technique of generating test data, and a technique of identifying the signature embedded in the generated test data are described. In the following FIGS. 2A to 2B and 3, 4 and 5, for a the language that uses vowels and consonants in a discriminated manner, the technique of generating test data, and the technique of identifying the signature embedded in the generated test data are described. FIGS. 2A and 2B are diagrams for illustrating the technique of generating test data with a value representing, as an attribute value, a vowel in the language that uses vowels and consonants in a discriminated manner.

A "language that uses vowels and consonants in a discriminated manner" is, for instance, English or European languages (e.g., German, French, Italian, or Spanish). However, the language is not limited thereto. The case where the language that uses vowels and consonants in a discriminated manner is English is hereinafter described as an example. In the "language that uses vowels and consonants in a discriminated manner", the attribute value intrinsic to each character is a value representing a vowel in the language that uses vowels and consonants in a discriminated manner. The value is one if a vowel is present.

In block 1, the user prepares a signature "21" (201) to be embedded in test data, and inputs the signature into the computer (101). Alternatively, the computer (101) can automatically generate the signature "21" (201) by, for instance, generating a random number or calculating a hash value in response to a signature generation request by the user. In block 2, the computer (101) receives the signature "21" (201). The computer (101) refers to a template table (211) of test data to be generated, and recognizes the number of items of the test data to be generated is two (a column X and a column Y). The computer (101) divides the signature "21" (201) by two, which is the number of items, and acquires the elements of the signature. The computer (101) thus divides the signature "21" (201) into one-digit numbers, which are an element "2" and an element "1" (202). The computer (101) associates the element "2" and the element "1" with the column X and the column Y in the template table (211), respectively, to generate the mapping table (212).

In block 3, the computer (101) refers to a vowel and consonant table (213), which is a table describing vowels and consonants, and determines a combination pattern (hereinafter, sometimes referred to as "pattern") of a vowel character and a consonant character such that, for each of the element "2" and the element "1" of the signature "21" (201), the number of vowel characters corresponds to the number of elements. The combination patterns of vowel characters and consonant characters include patterns that include only vowel characters but do not include any consonant character. Those skilled in the art can determine the number of vowel characters of a character string to be generated in the pattern. For instance, the number of vowels ranges from one to four. However, the number is not limited thereto.

The vowel and consonant table (213) is a table describing characters (vowels and consonants) prepared for creating test data. The vowel and consonant table (213) includes a vowel table (V) (214), a table of pre-vowel consonants (pre V) ($C_1$) (215), a table of consonants between vowels (between Vs) ($C_2$) (216), and a table of post-vowel consonants (post V) ($C_3$) (217). The vowel table (V) (214) only lists vowel characters. The table of pre-vowel consonants ($C_1$) (215) lists consonant characters disposed before a vowel character. The table of consonants between vowels ($C_2$) (216) lists consonant characters disposed between a vowel character and a vowel character. The table of post-vowel consonants ($C_3$) (217) lists consonant characters disposed after a vowel character. Those skilled in the art can appropriately set or select at least one of consonant characters listed in the table of pre-vowel consonants ($C_1$) (215), the table of consonants between vowels ($C_2$) (216) and the table of post-vowel consonants ($C_3$) (217). For instance, if a vowel character and a consonant character are combined in this order or a consonant character and a vowel character are combined in this order, those skilled in the art can select the consonant characters so as to make pronounceable combination patterns and list the combinations in the tables (215, 216 and 217). Pronounceability includes not only pronunciation by a person but also mechanical readability (through software) into speech.

The combination patterns of the vowel characters and the consonant characters are any one or a combination thereof:

(1) a vowel character immediately after a consonant character;

(2) a vowel character between consonant characters;

(3) a vowel character immediately before a consonant character;

(4) a vowel character at the beginning of a word;

(5) a vowel character at the end of a word; and (6) a vowel character immediately after another vowel character (i.e., sequence of vowel characters). The combination patterns of the vowel characters and the consonant characters may be pronounceable combination patterns.

In the example shown in FIG. 2A, as illustrated on the element "2" in the pattern A (203), the pattern B (204) and the pattern C (205), the computer (101) determines three combination patterns, which are "$V+C_2+V$" (a pattern including vowel characters at the beginning of a word and the end of the word), "$V+V+C_3$" (a pattern including vowel character at the beginning of a word and another vowel character immediately after the foregoing vowel character), and "$C_1+V+V$" (a pattern including a vowel character at the end of a word and a vowel character immediately after the other vowel character) such that the total number of vowels in the characters configuring a character string to be generated is the foregoing "2". In each of the determined patterns "$V+C_2+V$", "$V+V+C_3$" and "$C_1+V+V$", the determination is made such that the number of vowels is equal to the foregoing element "2". In other words, the total number of vowels is two such that values (e.g., one) representing vowels are equal to the element "2". The computer (101) can determine the combination pattern by, for instance, generating a random number or calculating a hash value such that the total number of vowels is two.

In the example shown in FIG. 2A, as illustrated on the element "1" in each of the pattern A (203), the pattern B (204) and the pattern C (205), the computer (101) determines the combination pattern "$C_1+V$" such that the total number of vowels among characters configuring a character string to be generated is the "1" in an analogous manner. The determined pattern "$C_1+V$" is thus determined such that the number of vowels is the element "1". In other words, the total number of vowels is one such that the value representing a vowel (e.g., one) is the element "1". The computer (101) can determine the combination pattern by, for instance, generating a random number or calculating a hash value such that the total number of vowels is one.

In block 4, the computer (101) selects a combination pattern of a vowel character, a consonant character and a vowel character from the vowel and consonant table (213) such that the element "2" in the pattern A (203) is "$V+C_2+V$". Likewise, the computer (101) selects the combination pattern of a vowel character, a vowel character and a consonant character from the vowel and consonant table (213) such that the element "2" in the pattern B (204) is "$V+V+C_3$". Likewise the computer (101) selects the combination pattern of a consonant character, a vowel character and a vowel character from the vowel and consonant table (213) such that the element "2" in the pattern C (205) is "$C_1+V+V$". The computer (101) can select the combination pattern of characters from the vowel and consonant table (213) by, for instance, generating a random number or calculating a hash value. The computer (101) can select the combination pattern of a consonant character and a vowel character from the vowel and consonant table (213), for each of patterns A to C (203, 204 and 205) by, for instance, generating a random number or calculating a hash value so as to select at least one character string.

Likewise, the computer (101) selects at least one combination pattern of a consonant character and a vowel character from the vowel and consonant table (213) such that the element "1" of the pattern A (203) is "$C_1+V$". Likewise, the computer (101) selects at least one combination pattern of a consonant character and a vowel character from the vowel and consonant table (213) such that the element "1" of the pattern B (204) is "$C_1+V$". Likewise, the computer (101) selects at least one combination pattern of a consonant character and a vowel character from the vowel and consonant table (213) such that the element "1" of the pattern C (205) is "$C_1+V$". The computer (101) can select the combination pattern of characters from the vowel and consonant table (213) for each of the patterns A to C (203, 204 and 205) by, for instance, generating a random number or calculating a hash value so as to make a at least one character string. An output table A (206), an output table B (207) and an output table C (208) show character strings generated on the basis of the pattern A (203), the pattern B (204) and the pattern C (205).

In block 5, the computer (101) can generate test data (209) by combining the tables, or the output table A (206), the output table B (207) and the output table C (208). The combining method can be performed by taking the character strings in the respective columns X and Y on any one row from the output table A (206), the output table B (207) and the output table C (208). The computer (101) can take the character strings in the respective columns X and Y on any one row, for instance, in order of the output table A (206), the output table B (207) and the output table C (208), or randomly. The computer (101) may output the test data (209) and the mapping information (212). The output may include, for instance, storing in a storing medium (e.g., sign 108 in FIG. 1) accessible by the computer (101), displaying on a screen of a display device, or output through a printer.

Figure 3:
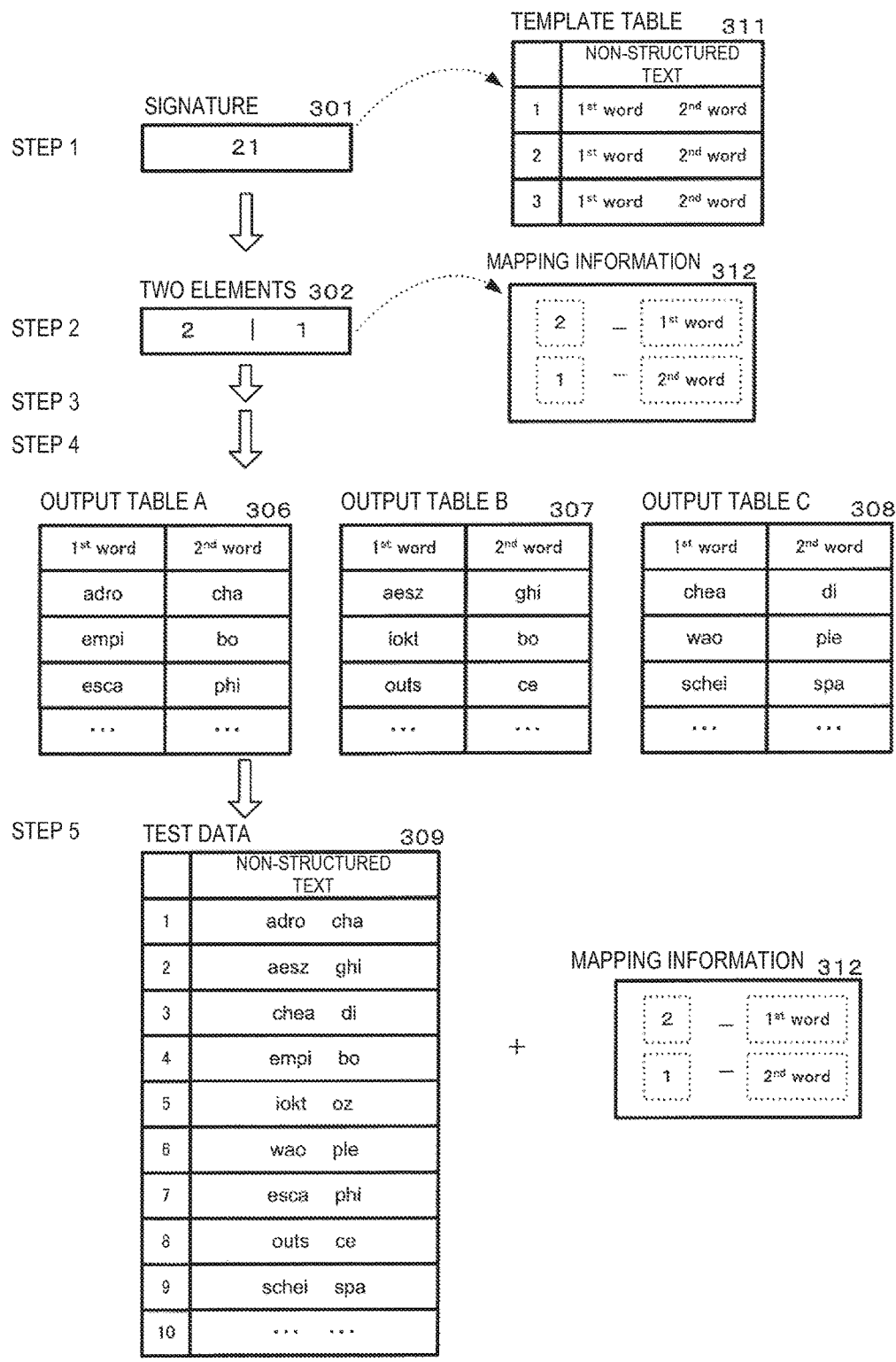
FIG. 3 is a diagram of showing an alternative technique of generating test data in accordance with an embodiment.

FIG. 3 is a diagram showing another embodiment different from the embodiment shown in FIGS. 2A and 2B. A template table (311) shown in FIG. 3 is different from the template table (211) shown in FIG. 2A, and a non-structured text. The non-structured text includes a position where a $1^{st}$ word corresponding to a character string to be input into a column X is input in the template table (311), and a position where a $2^{nd}$ word corresponding to a character string to be input into a column X is input in the template table (311).

In block 1, the user prepares a signature "21" (301) that is to be embedded into test data, and inputs the signature into the computer (101). Alternatively the computer (101) may automatically generate the signature "21" (301) by, for instance, generating a random number or calculating a hash value in response to a request by the user.

In block 2, the computer (101) receives the signature "21" (301). The computer (101) refers to the template table (311) of test data to be generated, and recognizes that the number of items where the character string is to be input is two (the $1^{st}$ word and $2^{nd}$ word). The computer (101) divides the signature "21" (301) by two, which is the number of items. The signature "21" (301) thus is divided into one-digit numbers, which are an element "2" and an element "1" (302). The computer (101) associates the element "2" and the element "1" with the $1^{st}$ word and the $2^{nd}$ word, respectively, to generate a mapping table (312). Blocks 3 and 4, are the same as the blocks in FIG. 2A. Accordingly, the description thereof is omitted here. An output table A (306), an output table B (307) and an output table C (308) illustrate character strings generated on the basis of the pattern A (same as 203), the pattern B (same as 204) and the pattern C (same as 205), respectively.

In block 5, the computer (101) can generate test data (309) by combining the tables, or the output table A (306), the output table B (307) and the output table C (308). The combining method can be performed by taking the character strings in the respective columns X and Y on any one row from the output table A (306), the output table B (307) and the output table C (308) and then inputting each of the taken characters into the template table (311). As to the input, the computer (101) can input a character (e.g., a space) other than a vowel and a consonant between the character string in the column X and the character string in the column Y in order to discriminate the character string in the column X and the character string in the column Y from each other. For instance, the computer (101) can take the character strings of the $1^{st}$ word and the $2^{nd}$ word in order of the output table A (306), the output table B (307) and the output table C (308) on row-by-row basis.

The computer (101) may output test data (309) and mapping information (312). The output may include, for instance, storing in a storing medium (e.g., sign 108 in FIG. 1) accessible by the computer (101), displaying on a screen, or output through the printer. The computer (101) can insert, into the test data (309), information with which the mapping information (312) is to be associated. For instance, the computer (101) can embed the mapping information (312) in the test data (309). The information can be used for identifying the mapping information associated with the test data, in a process of identifying the signature from the test data.

Figure 4:
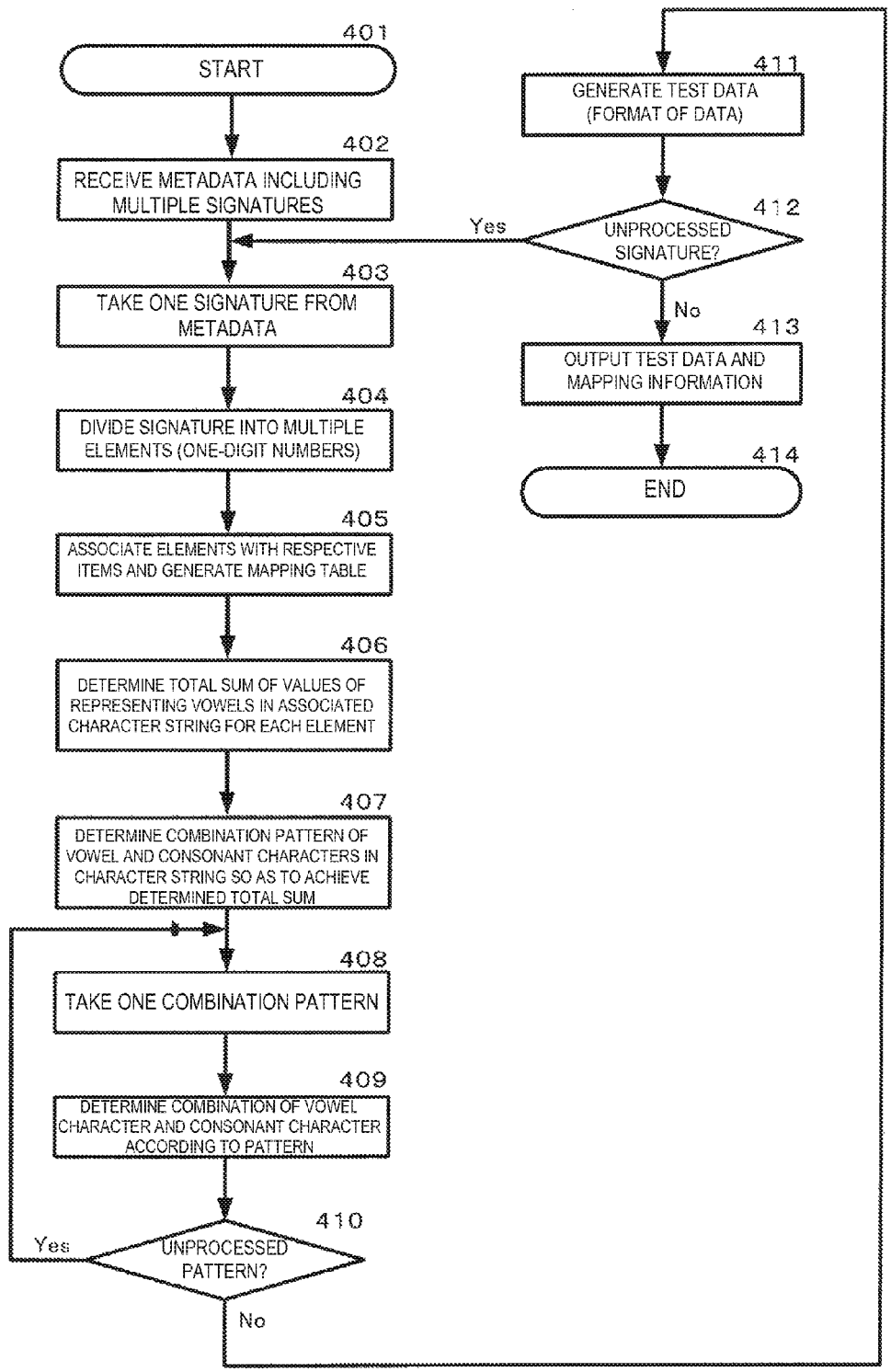
FIG. 4 is a flowchart showing the details of the flow of processes shown in FIGS. 2A and 2B in accordance with an embodiment.

FIG. 4 is a flowchart showing the details of the process of the embodiment shown in FIGS. 2A and 2B. In block 401, the computer (101) starts a process of generating test data using, as an attribute value, a value representing a vowel in the language that uses vowels and consonants in a discriminated manner. In block 402, the computer (101) receives metadata. The metadata has multiple signatures. If the metadata has only one signature, the metadata is the same as the signature. The multiple signatures are, for instance, at least two signatures selected from information on a test data generating tool (e.g., a product number, a version number, or a license number), a number intrinsic to a user who generates or uses test data (e.g., user ID), and date and time when the test data is generated. As the user designates multiple signatures to be embedded in the test data, the computer (101) stores the designated multiple signatures, as metadata, in for instance the storing medium (e.g., sign 108 in FIG. 1) accessible by the computer (101).

In block 403, the computer (101) takes one signature included in the metadata received in block 402. In block 404, the computer (101) refers to the template table of the test data to be generated, and acquires the number of items. The computer (101) divides the signature acquired in block 403 by the number of items to acquire the elements of the signature. Typically, in the case of generating test data on the language that uses vowels and consonants in a discriminated manner, the elements acquired by division are one-digit numbers. In block 405, the computer (101) associates the elements with the respective items in the template table, and generates the mapping table. The mapping table may be, for instance, mapping data storing mapping information that associates the elements with the respective items.

In block 406, the computer (101) determines the total sum of values representing a vowel in character strings input into the respective items in the template table according to the mapping table. That is, the computer (101) determines the element (one-digit number) in the mapping table as the total sum of the values. In block 407, the computer (101) refers to the vowel and consonant table, and determines the combination pattern of the vowel character and the consonant character so as to achieve the total sum determined in block 406, for each element, such that the number of vowel characters corresponds to the number of elements. The computer (101) can determine one or more combination patterns of vowel characters and consonant characters, for one element. In block 408, the computer (101) takes one combination pattern among the combination patterns determined in block 407.

In block 409, the computer (101) selects a combination of a vowel character and a consonant character that configures the character string from the vowel and consonant table so as to be the combination pattern taken in block 408. The computer (101) may select the combination of a consonant character and a vowel character from the vowel and consonant table by, for instance, generating a random number or calculating a hash value, for the combination pattern taken in block 408 so as to acquire at least one character string. The computer (101) can store the generated character string in, for instance, the temporary storing device (e.g., sign 103 in FIG. 1) of the computer (101) or the storing medium (e.g., sign 108 in FIG. 1) accessible by the computer (101). In block 410, the computer (101) determines whether or not there is any combination pattern having not been subjected to the process in block 409 yet among the combination patterns determined in block 407. The computer (101) returns the processing to block 408 in response to presence of the unprocessed combination pattern. In contrast, the computer (101) advances the processing to block 411 in response to absence of the unprocessed combination pattern. In block 411, the computer (101) can insert the character string stored in block 409 into the template table to generate test data. That is, the computer (101) shapes the generated character string into the format of the test data.

In block 412, the computer (101) determines whether or not there is any signature having not been subjected to the processes of blocks 403 to 411 among the signatures included in the metadata received in block 402. The computer (101) returns the processing to block 403 in response to presence of the unprocessed signature. In contrast, the computer (101) advances the processing to block 413 in response to absence of the unprocessed signature.

In block 413, the computer (101) can store the test data generated in block 411 and the mapping information generated in block 405 in the storing medium (e.g., sign 108 in FIG. 1) accessible by the computer (101). The output of the test data may include not only storing in a storing medium (e.g., sign 108 in FIG. 1) accessible by the computer (101) but also, for instance, displaying on a screen of the display device, or output through the printer. The mapping information is used for identifying the signature from the test data as shown in the flowchart illustrated in FIG. 5. In block 414, the computer (101) finishes the process of generating the test data using, as an attribute value, the value representing a vowel in the language that uses vowels and consonants in a discriminated manner.

Figure 5:
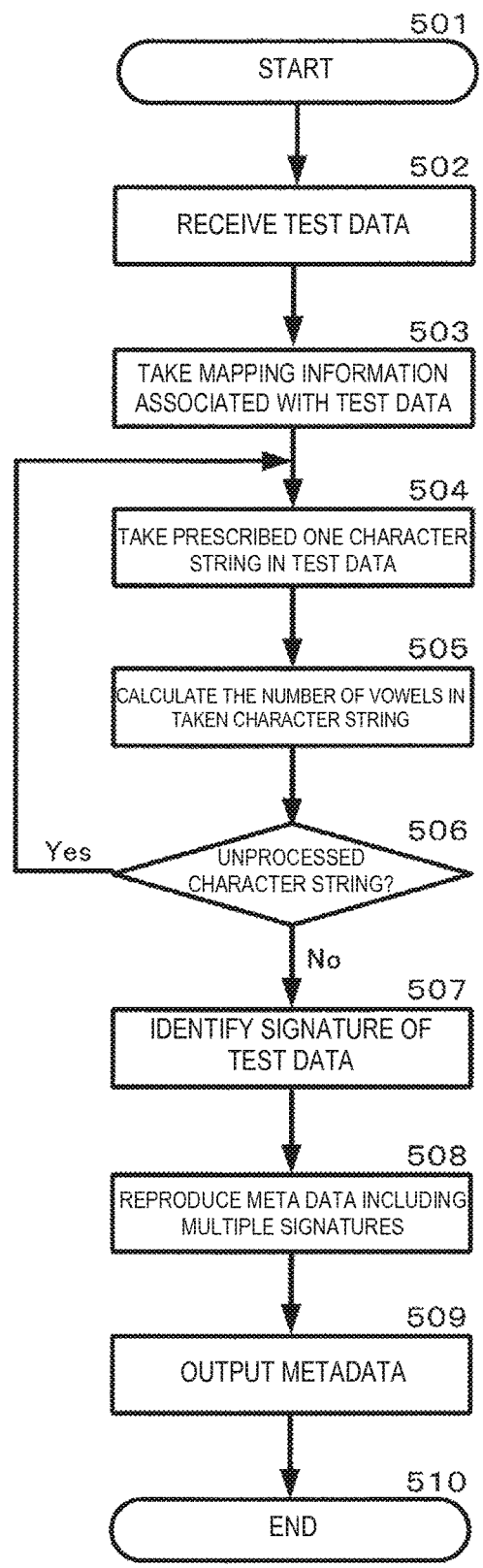
FIG. 5 is a flowchart of identifying a signature from test data generated according to the embodiment shown in FIGS. 2A and 2B in accordance with an embodiment.

FIG. 5 shows a flowchart of identifying the signature from the test data shown in FIGS. 2A and 2B. Hereinafter, the computer (101), which is a subject unit of each block, may be a computer physically identical to the computer (101) for each block shown in FIG. 4, or a different computer. In block 501, the computer (101) starts a process of identifying a signature from test data. In block 502, the computer (101) receives the test data. The computer (101) may receive the test data, for instance, through the storing medium accessible by the computer (101) or via a network, or by capturing a display screen on another computer or capturing a printed matter through a scanner.

In block 503, the computer (101) refers to the information embedded in the test data received in block 502, and takes the mapping information associated with the received test data. The computer (101) can take the mapping information, for instance, through the storing medium accessible by the computer (101), or via a network. In block 504, the computer (101) takes prescribed one character string from among the character strings in the test data received in block 502. In block 505, the computer (101) calculates the total sum of vowel characters in the character string taken in block 504. The total sum of vowel characters in the one prescribed character string corresponds to one element of the signature (i.e., number). In block 506, the computer (101) determines whether or not there is any character string having not been subjected to the processes in blocks 504 to 505 among the character strings in the test data received in block 502. The computer (101) returns the processing to block 504 in response to presence of the unprocessed character string. In contrast, the computer (101) advances the processing to block 507 in response to absence of the unprocessed character string.

In block 507, the computer (101) combines the total sums of the vowel characters calculated in block 505, and identifies the signature of the test data received in block 502. For instance, in the case where the total sums of the vowel characters calculated in block 505 is "2" and "1", the signature is "21", which is the combination of "2" and "1". In block 508, the computer (101) can combine the signatures identified in block 507 and reproduce (reconstruct) the meta data including multiple signature. In block 509, the computer (101) can store the meta data reproduced in block 508 into the storing medium (e.g., sign 108 in FIG. 1) accessible by the computer (101). In block 510, the computer (101) finishes the process of identifying a signature from test data.

The computer (101) can arbitrarily compare the signature identified in block 507 with the signature expected to be embedded in the test data received in block 502. As a result of the comparison, the computer (101) recognizes that the test data has not been falsified on the basis that the signature identified in block 507 matches with the signature expected to be embedded in the test data received in block 502. In contrast, as a result of the comparison, the computer (101) recognizes that the test data has been falsified on the basis that the signature identified in block 507 does not math with the signature expected to be embedded in the test data received in block 502. The computer (101) can acquire information about the date and time when the test data is generated or information on the generating tool from the metadata reproduced in block 508.

In FIGS. 2A to 2B and 3, 4 and 5, the technique of generating test data using a value representing a vowel in the language that uses vowels and consonants in a discriminated manner as an attribute value, and the technique of identifying the signature from the test data generated using the foregoing technique have been described according to the embodiment of the present invention. The embodiment using the value representing a vowel has the following characteristics. The character string in the test data generated may include characters (a vowel character and a consonant character) selected from the vowel and consonant table. Those skilled in the art can identify the consonant included in the generated data as a prescribed combination of a consonant (e.g., sp, fl and z (that is, in the table of pre-vowel consonants ($C_1$)), ks and vr (that is, in the table of consonants between vowels ($C_2$)), and l, rr and kt (that is, table of post-vowel consonants ($C_3$))) in the vowel and consonant table. Each vowel and each consonant configuring the character string in the test data have been selected by the computer generating a random number or calculating a hash value. Accordingly, the user can recognize that the generated character string has been certainly generated as test data, as shown in the test data (209) in FIG. 2B.

The signature embedded in the test data is reconstructed from the total sum of the vowels in the character string in the test data. Accordingly, the generated test data itself includes the meta information. For instance, it is provided that the total sums of vowels included in "item A", "item B", "item C" and "item D" in the test data is "1", "2", "3" and "4", respectively. In this case, the signature is "1234". The signature "1234" is common to every data set including the items A to D. Accordingly, the same signature can be embedded in prescribed items. Thus, the identified signature is the same even if only a piece of the test data (i.e., one of the data sets) is taken. The data set that does not match with the signature "1234" among the data sets including the items A to D can be determined as invalid data (e.g., falsified data).

The total sum of vowels in the character string is independent of the character code. Accordingly, even if the character code of the vowel characters is converted, the total sum of vowels is the same. That is, the total sum of vowels does not change even if the character code is converted. If the characters in the character string are uppercase characters or lowercase characters, the total sum of vowels in the character string does not change. Accordingly, even if the character code of the data generated using a prescribed number of vowel characters and any number of consonant characters is changed, the signature associated with the test data generated according to the embodiment is not lost.

Even in the case where the test data is printed, the total sum of vowels in the character string can be counted on the basis of the printed matter. Likewise, the total sum of vowels in the character string can be counted on the basis of a display screen even in the case where the test data is displayed on the display screen. Even whether the characters in the character string are uppercase characters or lowercase characters, the total sum of vowels in the character string does not change. Accordingly, the user can take the signature even in the case where the character string of the test data generated may be in any display format. The signature is the same in any of cases. Accordingly, only if the total sum of vowels in the prescribed character string in the test data is checked, it can be easily determined whether or not the test data has been correctly generated and has not been falsified.

In the case where the test data generated according to the embodiment includes multiple items, for instance, the case where the test data includes multiple data sets of "item A", "item B", "item C" and "item D", the same signature is embedded in the items A to D. Accordingly, in the case where the test data includes multiple items, the same signature can be included in each item.

The combination pattern can be changed, while the total sum of vowels in the character string is maintained constant (i.e., the same signature is included). That is, the length of character string to be generated can be changed by changing the number of constant characters while the number of vowel characters is maintained constant. Accordingly, variation in test data to be generated can be increased. Furthermore, redundant data can be minimized. Moreover, the generated test data is allowed to have a more realistic length. The test data itself generated according to the may include the signature that is recognizable, intrinsic characteristics (e.g., the foregoing "1234").

Figure 6A:
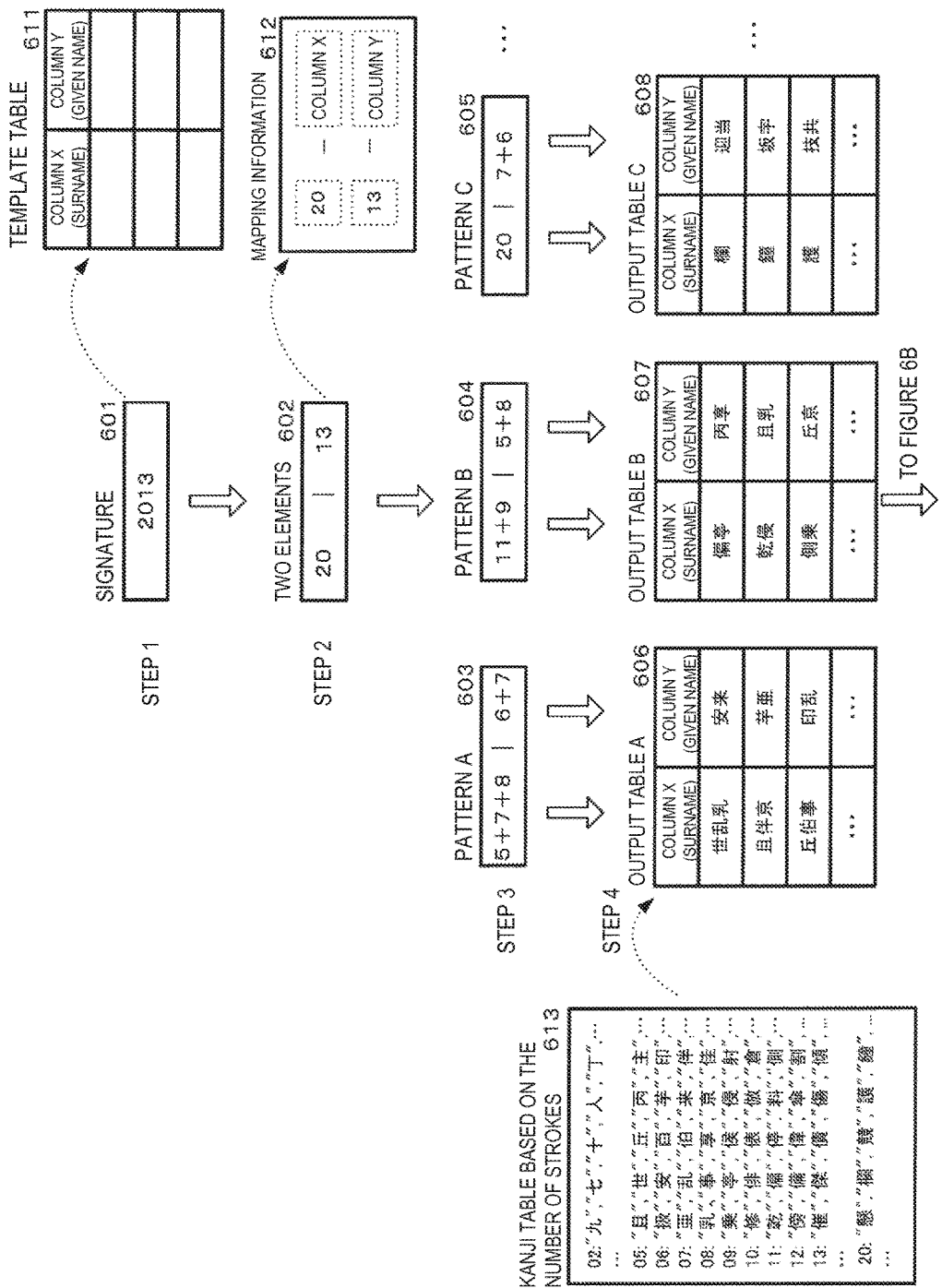
FIG. 6A is a diagram for illustrating a technique of generating test data using, as an attribute value, the number of strokes of a character in a language including characters having a prescribed number of strokes in accordance with an embodiment.
Figure 6B:
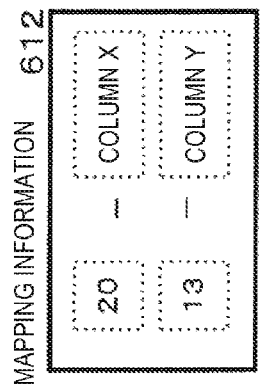
FIG. 6B is a diagram for illustrating the technique of generating test data using, as an attribute value, the number of strokes of a character in the language including characters having a prescribed number of strokes in accordance with an embodiment.

In the following FIGS. 6A to 6B and 7, 8 and 9, as to the language that includes characters having a prescribed number of strokes, the technique of generating test data and the technique of identifying the signature embedded in the generated test data are described. FIGS. 6A and 6B are diagrams for illustrating the technique of generating test data using, as an attribute value, the number of strokes of a character of the language that includes characters having a prescribed number of strokes.

In an embodiment, the "language that includes characters having a prescribed number of strokes" and "characters having the number of strokes" (i.e., characters with the defined numbers of strokes) are, for instance, Japanese and Kanji, Chinese and simplified Chinese characters or the traditional Chinese characters, or Korean and Hangul characters. However, these are not limited thereto. The case where the language that includes characters having a prescribed number of strokes is Japanese and the characters having the number of strokes are Kanji is hereinafter exemplified and described.

In the "language that includes characters having a prescribed number of strokes", the attribute value intrinsic to each character is the number of strokes of a character of the language. The number of strokes is, for instance, based on the number of strokes contained in a Kanji dictionary.

In block 1, the user prepares a signature "2013" (601) that is to be embedded in the test data, and inputs the signature into the computer (101). Alternatively, the computer (101) can automatically generate the signature "2013" (601) by, for instance, generating a random number or calculating a hash value in response to a signature generation request by the user.

In block 2, the computer (101) receives the signature "2013" (601). The computer (101) refers to a template table (611) of test data to be generated, and recognizes the number of items of the test data to be generated is two (a column X and a column Y).

The computer (101) divides the signature "2013" (601) by two, which is the number of items, and acquires the elements of the signature. The computer (101) thus divides the signature "2013" (601) into two elements, which are an element "20" and an element "13" (602).

The computer (101) associates the element "20" and the element "13" with the column X and the column Y in the template table (611), respectively, to generate a mapping table (612).

In block 3, the computer (101) refers to a Kanji table (613) based on the number of strokes, the table describing the numbers of strokes of Kanji (characters) and these Kanji (characters) associated with the numbers of strokes, and then determines a combination pattern (hereinafter, sometimes referred to as a "pattern") of the number of strokes of each Kanji in a character string associated with each of elements with respect to each of an element "20" and an element "13" of the signature "2013" (601) so as to achieve the total sum of the number of strokes corresponding to the number of elements. Those skilled in the art can determine the number of characters of Kanji configuring the character string to be generated in the pattern. The number of characters is, for instance, one to five. However, the number is not limited thereto.

The Kanji table (613) is a table that describes characters (Kanji) prepared for creating test data. The Kanji table (613) is a table of Kanji that describes the number of strokes of Kanji, and these Kanji associated with the number of strokes. One specific aspect of the Kanji table (613) may be, for instance, a table describing the number of strokes of each Kanji and at least one Kanji belonging to the number of strokes. Those skilled in the art can appropriately configure or select Kanji listed in the Kanji table (613).

In the example shown in FIG. 6A, as to the element "20", the computer (101) determines three combination patterns, or "5+7+8", "11+9" and "20", such that the total sum of the numbers of strokes of Kanji in the character string to be generated is the "20", as illustrated in the pattern A (603), the pattern B (604) and the pattern C (605). For each of the determined patterns "5+7+8", "11+9" and "20", it is determined such that the total sum of the numbers of strokes of Kanji configuring the character string is the element "20". The computer (101) may determine the combination pattern by, for instance, generating a random number or calculating a hash value such that the total sum of the number of strokes of Kanji configuring the character string is equal to the element "20".

Likewise, in the example shown in FIG. 6A, as to the element "13", the computer (101) determines three combination patterns, or "6+7", "5+8" and "7+6" as illustrated in the pattern A (603), the pattern B (604) and the pattern C (605) such that the total sum of the number of strokes of Kanji in the character string to be generated is the "13". For each of the determined patterns "6+7", "5+8" and "7+6", it is determined such that the total sum of the number of strokes of Kanji configuring the character string is the element "13". The computer (101) may determine the combination pattern by, for instance, generating a random number or calculating a hash value such that the total sum of the number of strokes of Kanji configuring the character string is equal to the element "13".

In block 4, the computer (101) selects the combination of a Kanji having the number of strokes 5, a Kanji having the number of strokes 7 and a Kanji having the number of strokes 8 from the Kanji table (613) so as to achieve "5+7+8" for the element "20" in the pattern A (603). Likewise, the computer (101) selects the combination of a Kanji having the number of strokes 11 and a Kanji having the number of strokes 9 from the Kanji table (613) so as to achieve "11+9" for the element "20" in the pattern B (604). Likewise, the computer (101) selects a Kanji having the number of strokes 20 from the Kanji table (613) so as to achieve "20" for the element "20" in the pattern C (605). The computer (101) may select the combination of the Kanji from the Kanji table (613) by, for instance, generating a random number or calculating a hash value. For each of the patterns A to C (603, 604 and 605), the computer (101) can select the combination of Kanji from the Kanji table (613) by, for instance, generating a random number or calculating a hash value so as to generate a character string according to each pattern.

Likewise, the computer (101) selects the combination of a Kanji having the number of strokes 6 and a Kanji having the number of strokes 7 from the Kanji table (613) so as to achieve "6+7" for the element "13" in the pattern A (603). Likewise, the computer (101) selects the combination of a Kanji having the number of strokes 5 and a Kanji having the number of strokes 8 from the Kanji table (613) so as to achieve "5+8" for the element "13" in the pattern B (604). Likewise, the computer (101) selects a Kanji having the number of strokes 7 and a Kanji having the number of strokes 6 in the pattern C (605) from the Kanji table (613) so as to achieve "7+6" for the element "13". The computer (101) may select the combination of the Kanji from the Kanji table (613) by, for instance, generating a random number or calculating a hash value. The computer (101) may select the combination of Kanji from the Kanji table (613) by, for instance, generating a random number or calculating a hash value for each of the patterns A to C (603, 604 and 605) so as to acquire at least one character string.

The output table A (606), the output table B (607) and the output table C (608) show character strings generated on the basis of the pattern A (603), the pattern B (604) and the pattern C (605), respectively.

In block 5, the computer (101) can generate test data (609) by combining the output table A (606), the output table B (607) and the output table C (608). The combining method may be performed by taking the character strings in the respective columns X and Y on any one row from the output table A (606), the output table B (607) and the output table C (608). The computer (101) can take the character strings in the respective columns X and Y on any one row, for instance, in an order of the output table A (606), the output table B (607) and the output table C (608), or randomly.

The computer (101) may output test data (609) and mapping information (612). The output may include, for instance, storing in a storing medium (e.g., sign 108 in FIG. 1) accessible by the computer (101), displaying on a screen of the display device, or output through the printer.

Figure 7:
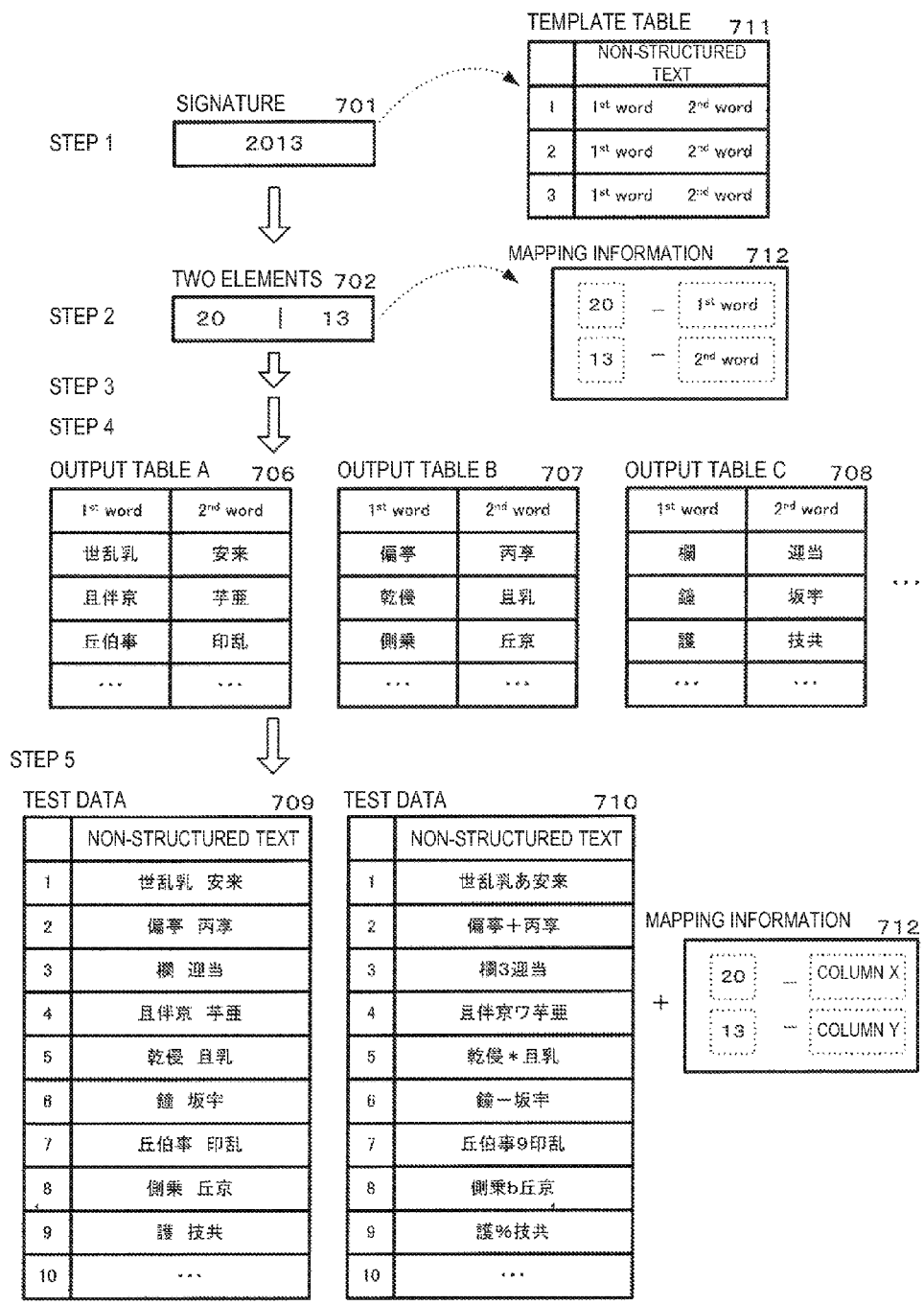
FIG. 7 is a diagram showing an embodiment different from the embodiment shown in FIGS. 6A and 6B in accordance with an embodiment.

FIG. 7 is a diagram showing an embodiment different from the embodiment shown in FIGS. 6A and 6B.

A template table (711) shown in FIG. 7 is different from the template table (611) shown in FIG. 6A, and is a non-structured text. The non-structured text has a position in the template table (611) where a $1^{st}$ word corresponding to a character string to be input into the column X is input, and a position in the template table (611) where a $2^{nd}$ word corresponding to a character string to be input into the column X is input.

In block 1, the user prepares a signature "2013" (701) that is to be embedded into test data, and inputs the signature into the computer (101). Alternatively, the computer (101) may automatically generate the signature "2013" (101) by, for instance, generating a random number or calculating a hash value in response to a request from the user.

In block 2, the computer (101) receives the signature "2013" (701). The computer (101) refers to the template table (711) of the test data to be generated, and recognizes that the number of items where the character strings are input is two (the 1st word and the $2^{nd}$ word).

The computer (101) divides the signature "2013" (701) by the number of items, or two. Accordingly, the signature "2013" (701) is divided into the element "20" and the element "13" (702).

The computer (101) associates the element "20" and the element "13" with the $1^{st}$ word and the $2^{nd}$ word, respectively, and generates a mapping table (712).

Blocks 3 and 4, are the same as the blocks in FIG. 6A. Accordingly, the description thereof is omitted here.

The output table A (706), the output table B (707) and the output table C (708) show character strings generated on the basis of the pattern A (same as 603), the pattern B (same as 604) and the pattern C (same as 605), respectively.

In block 5, the computer (101) can generate test data (709) by combining the tables, or the output table A (706), the output table B (707) and the output table C (708). The combining method may be performed by taking the character strings in the respective columns X and Y on any one row from the output table A (706), the output table B (707) and the output table C (708) and then inputting each of the taken characters into the template table (711). At this input, the computer (101) can insert a non-Kanji character (e.g., a space) between the character string from the column X and the character string from the column Y in order to discriminate the character string from the column X and the character string from the column Y. For instance, the computer (101) may take the character strings of the $1^{st}$ word and the $2^{nd}$ word on a row-by-row basis in an order of the output table A (706), the output table B (707) and the output table C (708).

Alternatively, the computer (101) can generate test data (710) by combining the tables, or the output table A (706), the output table B (707) and the output table C (708). The combining method can be performed by taking the character strings in the respective columns X and Y on any one row from the output table A (706), the output table B (707) and the output table C (708) and then inputting each of the taken characters into the template table (711). At this input, the computer (101) may insert a non-Kanji character (e.g., a Hiragana, a Katakana, a number, alphabet, or a symbol) between the character string from the column X and the character string from the column Y so as to discriminate, from each other, the character string from the column X and the character string from the column Y. For instance, the computer (101) may take the character strings of the $1^{st}$ word and the $2^{nd}$ word on a row-by-row basis in an order of the output table A (706), the output table B (707) and the output table C (708).

The computer (101) may output test data (709) and mapping information (712). The output may include, for instance, storing in a storing medium (e.g., sign 108 in FIG. 1) accessible by the computer (101), displaying on a screen of the display device, or output through the printer. The computer (101) can insert information for associating the mapping information (712) with the test data (709). For instance, the computer (101) may embed the mapping information (712) into the test data (709). The information can be used for identifying the mapping information associated with the test data in the process of identifying a signature from test data.

Figure 8:
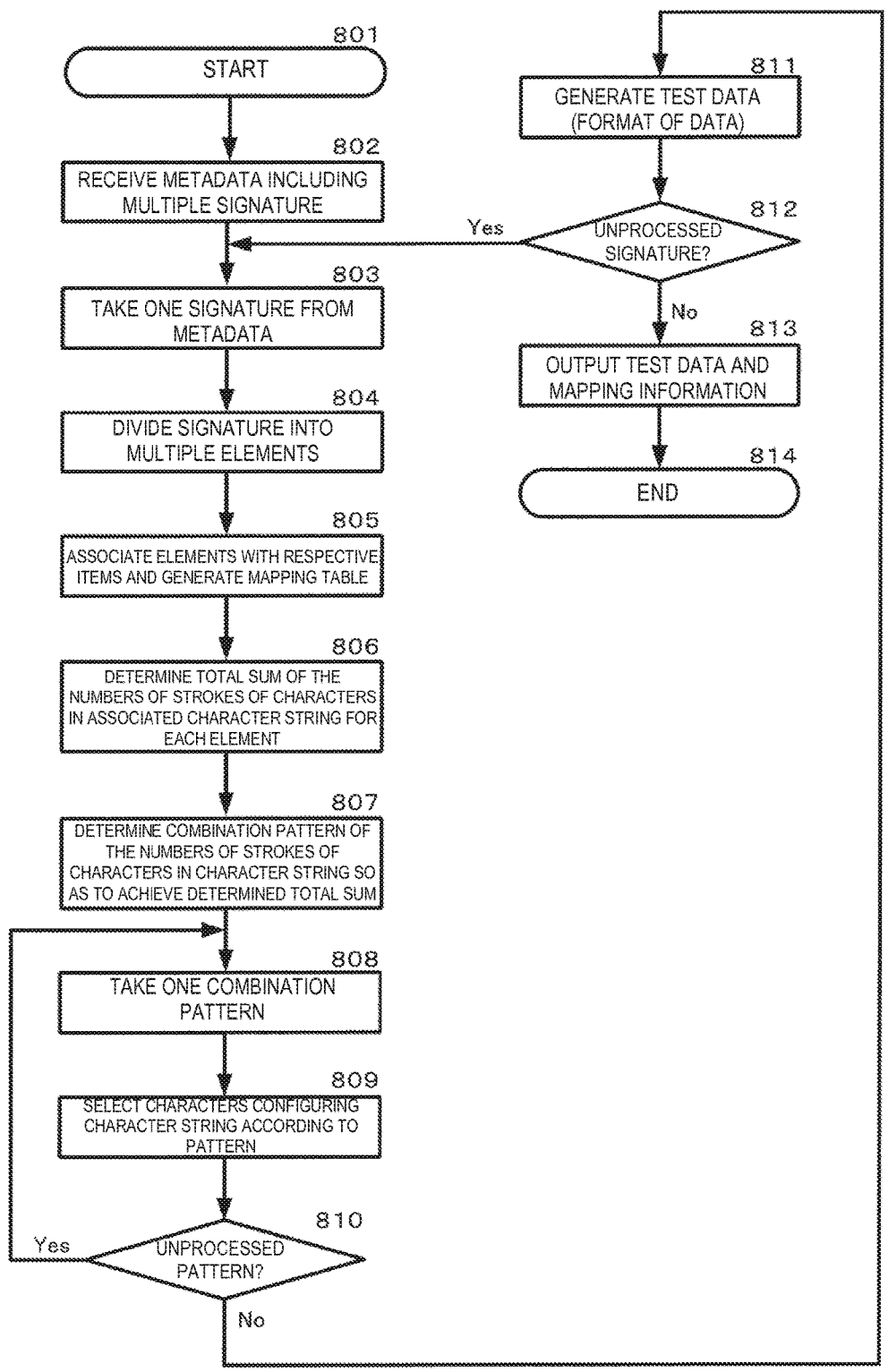
FIG. 8 is a flowchart showing the details of the flow of processes of the embodiment shown in FIGS. 6A and 6B in accordance with an embodiment.

FIG. 8 is a flowchart showing the details of the flow of the embodiment shown in FIGS. 6A and 6B.

In block 801, the computer (101) starts a process of generating test data using, as an attribute value, the number of strokes of a character in the language that includes characters having a prescribed number of strokes. In block 802, the computer (101) receives metadata. The metadata includes multiple signatures. If the metadata includes only one signature, the meta data is the same as the signature. The multiple signatures are, for instance, at least two signatures selected from among information on a test data generating tool (e.g., a product number, a version number, or a license number), a number intrinsic to a user who generates or uses test data (e.g., user ID), and e.g., date and time when the test data is generated. In response to designation of multiple signatures to be embedded into the test data by the user, the computer (101) stores the designated multiple signatures as metadata in, for instance, the storing medium (e.g., sign 108 in FIG. 1) accessible by the computer (101).

In block 803, the computer (101) takes one signature from among the signatures included in the metadata received in block 802.

In block 804, the computer (101) refers to the template table of the test data to be generated, and acquires the number of items. The computer (101) divides the signature taken in block 803 by the number of items to acquire the elements of the signature. Typically, in the case of generating test data on the language that includes characters having a prescribed number of strokes, the elements generated by division may be at least one-digit number.

In block 805, the computer (101) associates each element with an item in the template table and generates a mapping table. The mapping table may be, for instance, mapping data that stores mapping information associating the elements with the respective items.

In block 806, the computer (101) determines the total sum of the numbers of strokes of characters (Kanji) in a character string input into each item in the template table, according to the mapping table. That is, the computer (101) determines the element in the mapping table as the total sum of the values.

In block 807, the computer (101) refers to the Kanji table, and determines the combination patterns of the number of strokes of Kanji in the character string that are associated with the respective elements, for these elements, so as to achieve the total sum determined in block 806. The computer (101) can determine one or more combination patterns of the number of strokes of each Kanji, for one element.

In block 808, the computer (101) takes one combination pattern from among the combination patterns determined in block 807.

In block 809, the computer (101) selects a combination of Kanji configuring the character string from the Kanji table so as to be in conformity with the combination pattern taken in block 808. The computer (101) may select the combination of Kanji from the Kanji table by, for instance, generating a random number or calculating a hash value, so as to acquire at least one character string, for the combination pattern taken in block 808. The computer (101) may store the generated character string in, for instance, a temporary storing device (e.g., sign 103 in FIG. 1) of the computer (101) or the storing medium (e.g., sign 108 in FIG. 1) accessible by the computer (101).

In block 810, the computer (101) determines whether or not there is any combination pattern having not been subjected to the process in block 809 among the combination patterns determined in block 807. The computer (101) returns the processing to block 808 in response to presence of the unprocessed combination pattern. In contrast, the computer (101) advances the processing to block 811 in response to absence of the unprocessed combination pattern.

In block 811, the computer (101) may generate test data by inserting the character string stored in block 809 into the template table. That is, the computer (101) shapes the generated character string into the format of the test data.

In block 812, the computer (101) determines whether or not there is any signature having not been subjected to the processes in blocks 803 to 811 among the signatures included in the metadata received in block 802. The computer (101) returns the processing to block 803 in response to presence of the unprocessed signature. In contrast, the computer (101) advances the processing to block 813 in response to absence of the unprocessed signature.

In block 813, the computer (101) can store the test data generated in block 811 and the mapping information generated in block 805 in the storing medium (e.g., sign 108 in FIG. 1) accessible by the computer (101). The output of the test data may include not only storing in a storing medium (e.g., sign 108 in FIG. 1) accessible by the computer (101)

but also, for instance, displaying on a screen of the display device, or output through the printer. The mapping information is used for identifying the signature from the test data, as shown in the flowchart illustrated in FIG. 9. In block 814, the computer (101) finishes the process of generating test data using, as an attribute value, the number of strokes of a character in the language that includes characters having a prescribed number of strokes.

Figure 9:
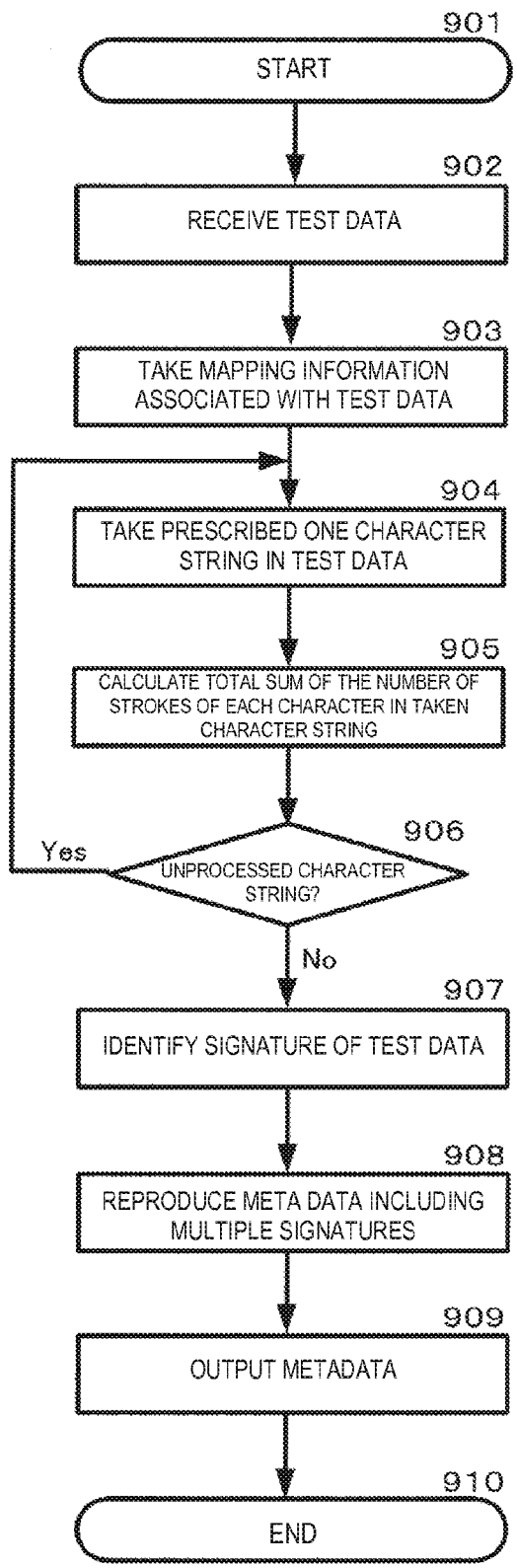
FIG. 9 is a flowchart of identifying a signature from test data generated according to the embodiment shown in FIGS. 6A and 6B in accordance with an embodiment.

FIG. 9 shows a flowchart of identifying the signature from test data generated according to the embodiment shown in FIGS. 6A and 6B. In the following description, the computer (101), which is a subject unit of each block, may be a computer physically identical to the computer (101) for each block shown in FIG. 8, or a different computer. In block 901, the computer (101) starts a process of identifying a signature from test data. In block 902, the computer (101) receives the test data. The computer (101) can receive the test data, for instance, through the storing medium accessible by the computer (101) or via a network, or by capturing a display screen on another computer or capturing a printed matter through a scanner. In block 903, the computer (101) refers to the information embedded in the test data received in block 902, and takes the mapping information associated with the received test data. The computer (101) can take the mapping information, for instance, through the storing medium accessible by the computer (101), or via a network.

In block 904, the computer (101) takes prescribed one character string from among the character strings in the test data received in block 902. In block 905, the computer (101) calculates the total sum of the numbers of strokes of characters (Kanji) in the character string taken in block 904. The total sum of the numbers of strokes of characters (Kanji) in the one prescribed character string corresponds to one element of the signature (i.e., number). In block 906, the computer (101) determines whether or not there is any character string having not been subjected to the processes in block 904 to 905 among the character strings in the test data received in block 902. The computer (101) returns the processing to block 904 in response to presence of the unprocessed character string. In contrast, the computer (101) advances the processing to block 907 in response to absence of the unprocessed character string. In block 907, the computer (101) combines the total sum of the numbers of strokes calculated in block 905, and identifies the signature of the test data received in block 902. For instance, in the case where the total sums of the numbers of strokes calculated in block 905 is "20" and "13", the signature is "2013", which is the combination of "20" and "13". In block 908, the computer (101) can combine the signatures identified in block 907 and reproduce (reconstruct) the metadata including multiple signatures. In block 909, the computer (101) can store the metadata reproduced in block 908 into the storing medium (e.g., sign 108 in FIG. 1) accessible by the computer (101). In block 910, the computer (101) finishes the process of identifying a signature from test data, according to the embodiment.

The computer (101) can arbitrarily compare the signature identified in block 907 with the signature expected to be embedded in the test data received in block 902. As a result of the comparison, the computer (101) recognizes that the test data has been correctly generated and has not been falsified on the basis that the signature identified in block 907 matches with the signature expected to be embedded in the test data received in block 902. In contrast, as a result of the comparison, the computer (101) recognizes that the test data has not been correctly generated or has been falsified on the basis that the signature identified in block 907 does not match with the signature expected to be embedded in the test data received in block 902. The computer (101) can acquire date and time when the test data is generated and information on a generating tool from the metadata reproduced in block 908.

Referring to FIG. 6A to FIG. 6B and FIGS. 7, 8 and 9, the technique of generating test data using, as an attribute value, the number of strokes of characters in the language that includes characters having a prescribed number of strokes, and the technique of identifying the signature from test data generated using the foregoing technique have been described. The embodiment using a prescribed number of strokes (e.g., the number of strokes of Kanji) has the following characteristics: The character string in the test data generated includes characters (Kanji) selected from the Kanji table. Those skilled in the art can identify, in the Kanji table, a Kanji included in the generated data as a prescribed Kanji. Each of Kanji configuring the character string in the test data has been selected by the computer generating a random number or calculating a hash value. Accordingly, the user can recognize that the generated character string has been certainly generated as test data, as shown in the test data (609) in FIG. 6B.

The signature embedded in the test data generated is reconstructed from the total sum of the numbers of strokes of Kanji in the character string in the test data. Accordingly, the generated test data itself includes the meta information. For instance, it is provided that the total sums of the numbers of strokes of Kanji included in "item A", "item B", "item C" and "item D" in the test data are "20", "13", "12" and "31", respectively. In this case, the signature is "20131231". The signature "20131231" is common to every data set including the items A to D. Accordingly, the same signature can be embedded in prescribed items. Thus, the identified signature is the same even if only a piece of the test data (i.e., one of the data sets) is taken. The data set that does not match with the signature "20131231" among the data sets including the items A to D can be determined as invalid data (e.g., falsified data etc.).

The numbers of strokes of Kanji in a character string and the total sum thereof are independent of the character code. Accordingly, even if the character code of the Kanji is converted, the numbers of strokes of the Kanji and the total sum thereof are the same. That is, the numbers of strokes of Kanji and the total sum thereof do not change even if the character code is converted. Accordingly, even if the character code of data generated using Kanji, the signature associated with the test data is not lost.

Even in the case where the test data is printed, the numbers of strokes of Kanji in the character string and the total sum thereof can be counted on the basis of the printed matter. Likewise, even in the case where the test data is displayed on a display screen, the numbers of strokes of Kanji in the character string and the total sum thereof can be counted from the display screen. Thus, even in any manner where the character string of the test data generated is displayed, the user can take (recognize) the signature. The signature is the same in any of cases. Accordingly, only if the total sum of the numbers of strokes of Kanji in a prescribed character string in the test data is verified, it can be easily determined whether or not the test data has been correctly generated and has not been falsified.

In the case where the test data generated includes multiple items, for instance, the case where the test data includes multiple data sets of "item A", "item B", "item C" and "item D", the same signature is embedded in the items A to D.

Accordingly, in the case where the test data includes multiple items, the same signature can be included in each item.

The combination pattern can be changed, while the total sum of the numbers of strokes of Kanji is maintained constant (i.e., the same signature is included). Thus, the length (the number of Kanji) of the character string to be generated can be changed. Accordingly, variation in test data to be generated can be increased. Furthermore, redundant data can be minimized. Moreover, the generated test data is allowed to have a more realistic length. The test data itself may include the signature that is recognizable, intrinsic characteristics (e.g., the "20131231").

Figure 10:
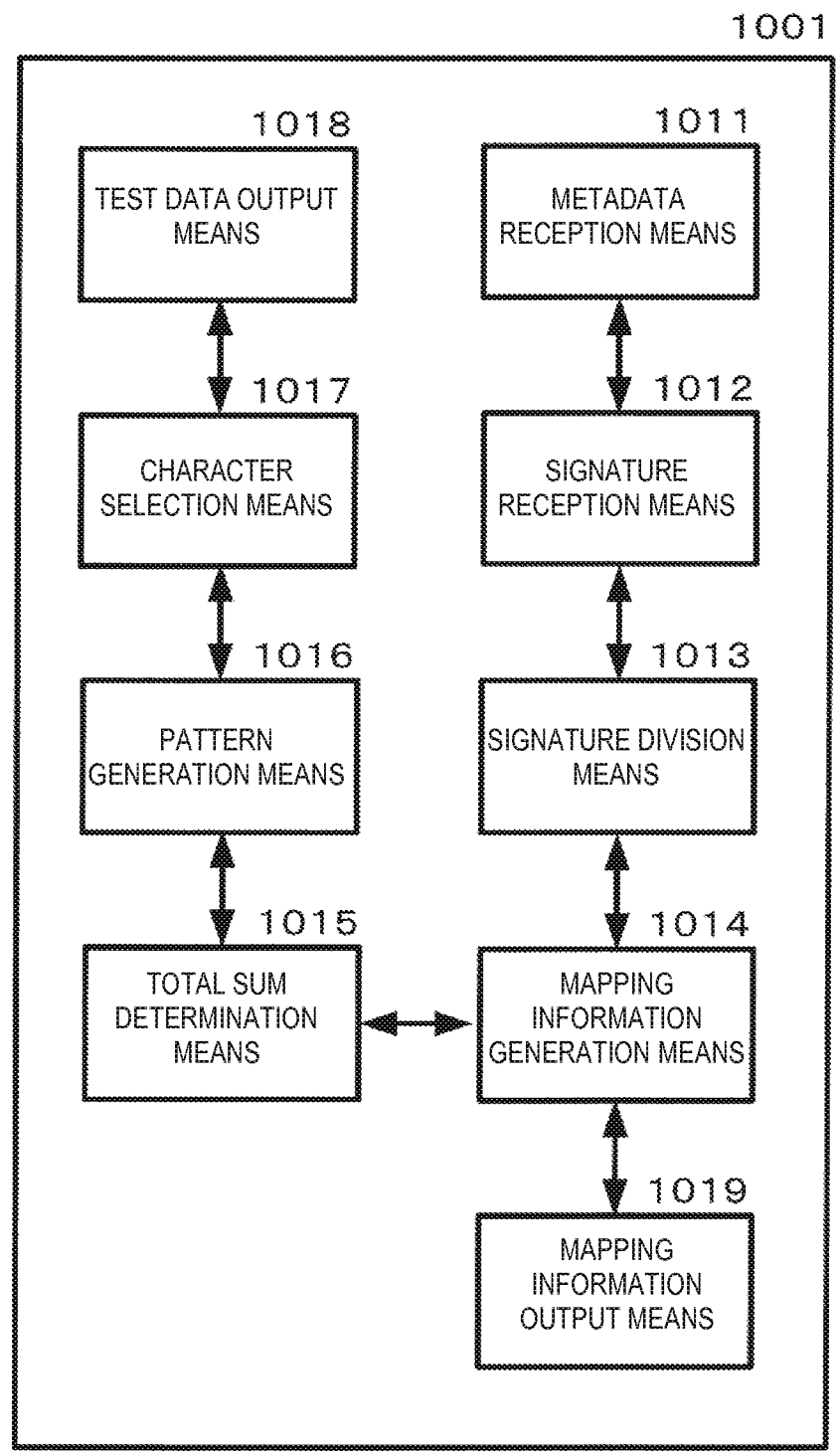
FIG. 10 is a functional block diagram of a computer configured to automatically generates test data according to an embodiment.

FIG. 10 is a diagram showing an example of a functional block diagram of a computer that preferably includes a hardware configuration in conformity with FIG. 1 and automatically generates test data. The computer (1001) is a computer that automatically generates test data, for instance, a computer shown in FIG. 1. The computer (1001) includes metadata reception module (1011), signature reception module (1012), signature division module (1013), mapping information generation module (1014), total sum determination module (1015), pattern generation module (1016), character selection module (1017), and test data output module (1018) and mapping information output module (1019).

The metadata reception module (1011) receives meta data from, for instance, the storing medium (e.g., sign 108 in FIG. 1) accessible by the computer (101). The metadata reception module (1011) can execute block 402 shown in FIG. 4 and block 802 shown in FIG. 8. The signature reception module (1012) takes a signature that is to be embedded into at least one character string to be generated, from the metadata received by the meta data reception module (1011). Alternatively, the signature reception module (1012) receives the signature to be embedded in at least one character string to be generated in the metadata received by the metadata reception module (1011).

The signature reception module (1012) can execute block 403 shown in FIG. 4 and block 803 shown in FIG. 8. The signature division module (1013) divides the signature received by the signature reception module (1012) into multiple elements. Furthermore, the signature division module (1013) can divide the signature into one-digit numbers. The signature division module (1013) can execute blocks 404 and 412 shown in FIG. 4 and blocks 804 and 812 shown in FIG. 8.

In the case where test data includes multiple items, the mapping information generation module (1014) can associate the elements with the respective items. In the case where test data includes multiple items, the mapping information generation module (1014) may associate the elements with respective words in the item.

The mapping information generation module (1014) may execute block 405 shown in FIG. 4 and block 805 shown in FIG. 8. The total sum determination module (1015) determines the total sum of attribute values intrinsic to characters in the character string and associated with each element of the signature.

The total sum determination module (1015) may execute block 406 shown in FIG. 4 and block 806 shown in FIG. 8. The pattern generation module (1016) may determine at least one combination pattern of characters in a character string so as to achieve the total sum determined by the total sum determination module (1015). The pattern generation module (1016) may execute block 407 shown in FIG. 4 and block 807 shown in FIG. 8. The character selection module (1017) selects at least one of characters configuring the character string from the character table that describes characters prepared to create the test data so as to achieve the determined total sum, for each element of the signature, and generates test data including a character string including the selected characters. The character selection module (1017) may determine at least one combination pattern of the attribute values intrinsic to the respective characters in the character string so as to achieve the determined total sum. Furthermore, the character selection module (1017) may select at least one of characters configuring the character string, for each combination pattern of the attribute values intrinsic to the respective characters from the character table.

The character selection module (1017) may execute blocks 408 to 409 and 410 shown in FIG. 4 and blocks 808 to 809 and 810 shown in FIG. 8. The test data output module (1018) generates test data by inserting the character string generated by the character selection module (1017) into the template table. The test data output module (1018) shapes the generated character string into the format of the test data. The test data output module (1018) outputs the generated test data. The test data output module (1018) may execute blocks 411 and 413 shown in FIG. 4 (output of the test data) and blocks 811 and 813 shown in FIG. 8 (output of the test data). The mapping information output module (1019) outputs the mapping information generated by the mapping information generation module (1014) to, for instance, the storing medium (e.g., sign 108 in FIG. 1) accessible by the computer (101). The mapping information output module (1019) may execute block 413 shown in FIG. 4 (output of the mapping information) and block 813 shown in FIG. 8 (output of the mapping information).

Figure 11:
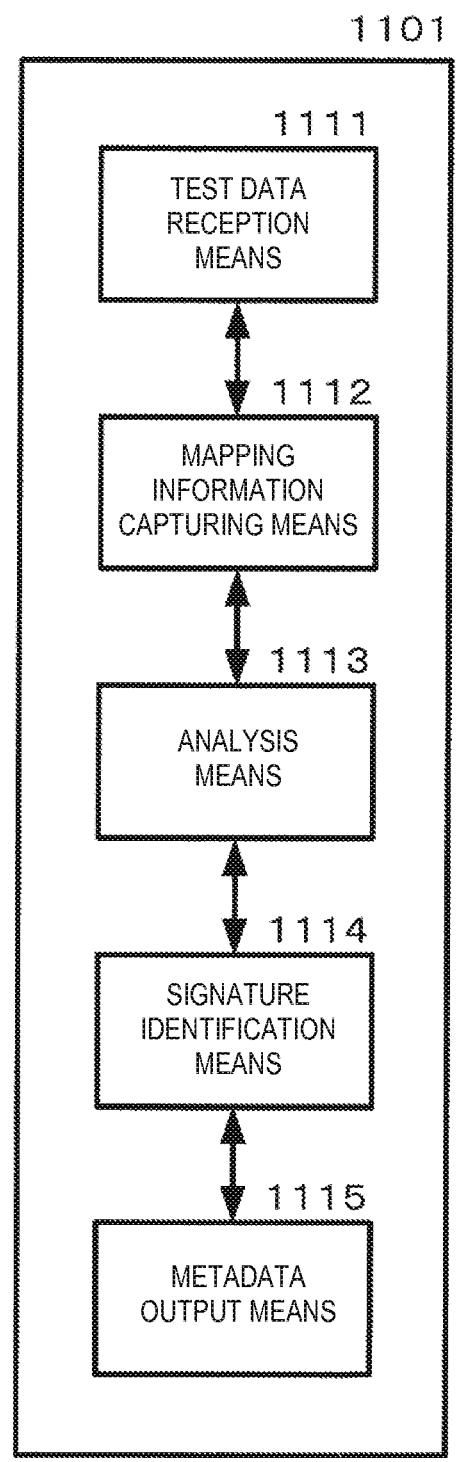
FIG. 11 is a diagram showing an example of a functional block diagram of a computer that preferably includes the hardware configuration according to FIG. 1 and identifies a signature embedded in test data according to an embodiment.

FIG. 11 is a diagram showing an example of a functional block diagram of a computer that preferably includes a hardware configuration in conformity with FIG. 1 and identifies a signature embedded in test data. The computer (1101) is a computer that identifies a signature embedded in test data, for instance, a computer shown in FIG. 1. The computer (1101) includes test data reception module (1111), mapping information capturing module (1112), analysis module (1113), signature identification module (1114) and metadata output module (1115). The test data reception module (1111) receives the test data. The test data includes multiple items. The test data reception module (1111) may execute block 502 shown in FIG. 5 and block 902 shown in FIG. 9.

The mapping information capturing module (1112) receives mapping information. The mapping information includes mapping information between an item and the total sum of the attribute values associated with the item. The mapping information capturing module (1112) may execute block 503 shown in FIG. 5 and block 903 shown in FIG. 9. The analysis module (1113) analyzes the attribute values intrinsic to the respective characters in the character string in the test data on the basis of the mapping information received by the mapping information capturing module (1112), and acquires the total sum of the attribute values. The analysis module (1113) may execute blocks 504 to 506 shown in FIG. 5 and block 904 to 906 shown in FIG. 9.

The signature identification module (1114) identifies the signatures of the test data on the basis of the total sum acquired by the analysis module (1113). The signature identification module (1114) combines the identified signatures and reproduces meta data including the multiple signatures. The signature identification module (1114) may execute blocks 507 to 508 shown in FIG. 5 and blocks 907 to 908 shown in FIG. 9. The metadata output module (1115) stores the metadata reproduced by the signature identification module (1114), into storing medium. The metadata output module (1115) executes block 509 shown in FIG. 5 and block 909 shown in FIG. 9.

FIG. 12 shows an example of a character string (a combination of vowel characters and consonant characters in the character string) selected so as to achieve the total sum of values representing vowels in a character string. This example of the character string is for the cases where the total sum of vowel characters in the character string is one (1 vowel), two (2 vowels), three (3 vowels), four (4 vowels) and five (5 vowels). As apparent from the example of this character string, it can be understood that the generated character string has been certainly generated as test data. The generated character string itself includes the signature (the total sum of values representing vowels in the character string).

FIG. 13 shows an example of a character string selected so as to achieve the total sum of the numbers of strokes of respective characters in the character strings. The example of the following character string is for the cases where the total sum of the numbers of strokes of Kanji in the character string is 12 strokes to 24 strokes. As apparent from the example of the character string, it can be understood that the generated character string has been certainly generated as test data. The generated character string itself includes the signature (the total sum of the numbers of strokes of the respective characters in the character string).

It is a matter of course that those skilled in the art can easily assume various modifications where each hardware component of the computer used in the embodiment of the present invention is combined with multiple machines, to which functions are allocated and on which the functions are performed. It is a matter of course that these modifications are included in the concept of the embodiments. It should be noted that these components are for exemplification. Not all these components are necessarily configure indispensable component of the embodiments.

Embodiments of the present invention can be achieved by hardware, software or a combination of hardware and software. Execution through combination of hardware and software is typified by execution through a computer in which the computer program is installed. In such a case, the computer program is loaded into the memory of the computer and executed, thereby allowing the computer program to control the computer and causing the computer to execute processes pertaining to the present invention. The computer program may include a group of instructions that can be represented by any language, code or representation. Such a group of instructions allows the computer to directly execute a specific function, or execute processes after execution of one or both of conversion into another language, code or representation, and copying onto another medium.

Embodiments may be a system, a method, and/or a computer program product. The computer program product may include a computer readable storage medium (or media) having computer readable program instructions thereon for causing a processor to carry out aspects of the embodiments. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one more other features, integers, blocks, operations, element components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implementable method of automatically generating, by a computer testing system, test data for testing a computer system, the test data including a character string, the method comprising:

receiving, by the computer testing system, a signature of the character string to be generated, the character string comprising one or more words;

dividing, by the computer testing system, the signature into a plurality of elements, each element being a numeric value indicative of a total sum of attribute values in a corresponding word in the character string, wherein each element in the signature maps to a respective word in the character string;

for each element of the signature:
generating, by the computer testing system, a combination of numeric values, such that a sum of the numeric values equals a value of the element, wherein the combination includes a predetermined number of numeric values;

selecting, by the computer testing system, at least one combination of characters configuring the corresponding word from the character string, the selection being from a character table data-structure, and wherein the combination of characters is selected so as to achieve the determined total sum of attribute values for the corresponding word from the character string;

in response to the character table data-structure including additional combinations of characters that match the determined total sum of attribute values, repeatedly selecting an additional combination of characters; and generating, by the computer testing system, the test data by including the selected combinations of characters; and using, by the computer testing system, the generated test data to test one or more operations of the computer system by using the test data as input.

2. The method according to claim 1, wherein selecting the at least one of characters from the character table, further comprises determining at least one combination pattern of the attribute values intrinsic to the respective characters in the character string so as to achieve the determined total sum.

3. The method according to claim 2, wherein selecting the at least one of characters from the character table, further comprises selecting at least one of characters configuring the character string from the character table, for each combination pattern of the attribute values intrinsic to the respective characters.

4. The method according to claim 1, further comprising dividing the signature into multiple elements.

5. The method according to claim 4, wherein the test data is data including multiple items, further comprising:
associating the elements with the respective items, or
associating the elements with respective words in the items.

6. The method according to claim 4, wherein dividing the signature into multiple elements, comprises dividing the signature into one-digit numbers, the divided one-digit numbers configuring each element of the signature.

7. The method according to claim 1, wherein the attribute value and the character table are in any of the following combination patterns:
the attribute value is a value representing a vowel in a language that uses vowels and consonants in a discriminated manner, and the character table is a table describing vowels and consonants; or
the attribute value is a number of strokes of a character of a language that includes characters having a prescribed number of strokes, and the character table is a table describing the number of strokes and the character associated with the number of strokes.

8. The method according to claim 7, wherein:
in a case where the attribute value is the value representing a vowel in the language that uses vowels and consonants in a discriminated manner and the character table is the table describing the vowels and the consonants,
determining the total sum of the attribute values comprises determining a total sum of values representing vowels in a character string associated with each element of the signature, and
selecting the at least one of characters from the character table further comprises determining at least one combination pattern of a vowel character and a consonant character in the character string so as to achieve the determined total sum, for each element of the signature.

9. The method according to claim 8, wherein selecting the at least one of characters from the character table further comprises selecting characters configuring the character string from the character table, for each of the combination patterns of vowel characters and consonant characters.

10. The method according to claim 8, wherein:
the combination pattern of the vowel character and the consonant character is any one or combination of:
the vowel character is immediately after the consonant character;
the vowel character is between the consonant characters;
the vowel character is immediately before the consonant character;
the vowel character is at a beginning of a word;
the vowel character is at an end of a word; or
the vowel character is immediately after another vowel character.

11. The method according to claim 8, wherein the combination pattern of the vowel character and the consonant character is a pronounceable combination.

12. The method according to claim 7, wherein:
in a case where the attribute value is the number of strokes of the character in the language that includes characters having a prescribed number of strokes and the character table is a table describing the number of strokes and the character associated with the number of strokes,
determining the total sum of the attribute value comprises determining a total sum of the number of strokes of each character in a character string associated with each element of the signature, and
determining at least one combination pattern of the numbers of strokes of the respective characters in the character string so as to achieve the determined total sum, for each element of the signature.

13. The method according to claim 12, wherein:
selecting the at least one of characters from the character table comprises selecting at least one of characters configuring the character string from the character table, for each combination pattern of the numbers of strokes of the respective characters.

14. The method according to claim 1, wherein generating the test data further comprises inserting, in the test data, at least one delimiter of a type different from a type of characters of a first character string associated with a first element and a second character string associated with a second element, wherein the delimiter is inserted between the first and second character strings.

15. The method according to claim 2, wherein selecting the at least one character from the character table comprises:
determining at least one of the combination patterns by generating a random number or calculating a hash value; and/or
selecting the at least one character from the character table by generating a random number or calculating a hash value for the character string to be generated.

16. A system for automatically generating test data for testing a computer system, the test data including a character string, the system comprising:
a memory having computer readable instructions; and
a processor for executing the computer readable instructions, the processor configured for:
receiving a signature of the character string to be generated, the character string comprising one or more words;
dividing the signature into a plurality of elements, each element being a numeric value indicative of a total sum of attribute values in a corresponding word in the character string, wherein each element in the signature maps to a respective word in the character string;
for each element of the signature:
generating, by the computer testing system, a combination of numeric values, such that a sum of the numeric values equals a value of the element, wherein the combination includes a predetermined number of numeric values;
selecting at least one combination of characters configuring the corresponding word from the character string, the selection being from a character table data-structure, and wherein the combination of characters is selected so as to achieve the determined total sum of attribute values for the corresponding word from the character string;
in response to the character table data-structure including additional combinations of characters that match the determined total sum of attribute values, repeatedly selecting an additional combination of characters; and
generating the test data by including the selected combinations of characters; and
using the generated test data to test one or more operations of the computer system by using the test data as input.

17. The system according to claim 16, wherein the attribute value is a value representing a vowel in a language that uses vowels and consonants in a discriminated manner, and the character table is a table describing vowels and consonants.

18. The system according to claim 16, wherein the attribute value is a number of strokes of a character of a language that includes characters having a prescribed number of strokes, and the character table is a table describing the number of strokes and the character associated with the number of strokes.

19. The system of claim 16, wherein the signature indicates an identity of a test data generation tool that generated that the test data.

20. A computer program product for automatically generating test data for testing a computer system, the test data including a character string, the computer program product comprising non-transitory computer readable storage medium with computer executable instructions embedded therein, wherein the non-transitory computer readable storage medium includes instructions for:

receiving a signature of the character string to be generated, the character string comprising one or more words;

dividing the signature into a plurality of elements, each element being a numeric value indicative of a total sum of attribute values in a corresponding word in the character string, wherein each element in the signature maps to a respective word in the character string;

for each element of the signature:

generating, by the computer testing system, a combination of numeric values, such that a sum of the numeric values equals a value of the element, wherein the combination includes a predetermined number of numeric values;

selecting at least one combination of characters configuring the corresponding word from the character string, the selection being from a character table data-structure, and wherein the combination of characters is selected so as to achieve the determined total sum of attribute values for the corresponding word from the character string;

in response to the character table data-structure including additional combinations of characters that match the determined total sum of attribute values, repeatedly selecting an additional combination of characters; and generating the test data by including the selected combinations of characters; and using the generated test data to test one or more operations of the computer system by using the test data as input.

* * * * *